US008533273B2

(12) United States Patent
Murakami

(10) Patent No.: US 8,533,273 B2
(45) Date of Patent: Sep. 10, 2013

(54) METHOD, APPARATUS, AND COMPUTER READABLE STORAGE MEDIUM FOR CONTROLLING COMMUNICATION

(75) Inventor: Masahiko Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 370 days.

(21) Appl. No.: 12/232,387

(22) Filed: Sep. 16, 2008

(65) Prior Publication Data

US 2009/0077159 A1    Mar. 19, 2009

(30) Foreign Application Priority Data

Sep. 18, 2007  (JP) ................ 2007-240510

(51) Int. Cl.
*G06F 15/16* (2006.01)
(52) U.S. Cl.
USPC ............................ 709/206; 709/217; 709/223
(58) Field of Classification Search
USPC .......................................... 709/223, 206, 217
See application file for complete search history.

(56) References Cited

U.S. PATENT DOCUMENTS

| | | | | |
|---|---|---|---|---|
| 6,650,440 | B1 * | 11/2003 | Wing ............................ | 358/402 |
| 6,701,353 | B1 * | 3/2004 | Block ........................... | 709/219 |
| 6,799,251 | B1 * | 9/2004 | Jacobs et al. .................. | 711/133 |
| 6,895,285 | B2 * | 5/2005 | Maity ........................... | 700/27 |
| 6,947,399 | B1 * | 9/2005 | Sen et al. ...................... | 370/331 |
| 7,127,502 | B1 * | 10/2006 | Nishikado et al. ........... | 709/219 |
| 7,248,598 | B2 * | 7/2007 | Couty ........................... | 370/423 |
| 2002/0194491 | A1 * | 12/2002 | Natanzon et al. ............. | 713/200 |
| 2003/0135639 | A1 * | 7/2003 | Marejka et al. .............. | 709/232 |
| 2005/0080796 | A1 * | 4/2005 | Midgley ....................... | 707/100 |
| 2005/0081059 | A1 * | 4/2005 | Bandini et al. ............... | 713/201 |
| 2005/0254430 | A1 * | 11/2005 | Clark et al. ................... | 370/241 |
| 2005/0267978 | A1 * | 12/2005 | Satapati ........................ | 709/230 |
| 2006/0238821 | A1 * | 10/2006 | Ratcliff ......................... | 358/400 |
| 2006/0271642 | A1 * | 11/2006 | Stavrakos et al. ............. | 709/217 |
| 2006/0276209 | A1 * | 12/2006 | Neves et al. ................. | 455/466 |
| 2007/0195167 | A1 * | 8/2007 | Ishiyama ................... | 348/207.1 |
| 2007/0255815 | A1 * | 11/2007 | Justice et al. ................. | 709/223 |
| 2008/0010410 | A1 * | 1/2008 | Zilbershtein et al. ......... | 711/118 |
| 2008/0045145 | A1 * | 2/2008 | Nakatsugawa ............... | 455/11.1 |
| 2008/0154877 | A1 * | 6/2008 | Joshi et al. ........................ | 707/5 |
| 2008/0155028 | A1 * | 6/2008 | Martin et al. ................. | 709/206 |

FOREIGN PATENT DOCUMENTS

| | | |
|---|---|---|
| JP | 11-017679 | 1/1999 |
| JP | 2006-293466 | 10/2006 |

OTHER PUBLICATIONS

Notice of Reasons for Refusal for Japanese Patent Application No. 2007-240510; mailed Jul. 5, 2011.

* cited by examiner

*Primary Examiner* — Waseem Ashraf
(74) *Attorney, Agent, or Firm* — Staas & Halsey LLP

(57) ABSTRACT

A transfer controller determines whether or not a communication message received by a receiver satisfies a predetermined condition, on the basis of data stored in a communication data storage. When the communication message received by the receiver satisfies the predetermined condition, the transfer controller stops and cancels the process for transferring the communication message performed by the relay. The transfer controller stores, in the communication data storage, data regarding the communication message relayed by the relay. When the transfer controller stops the transfer of the communication message, a proxy register generates proxy data on the basis of the data stored in the communication data storage and registers the proxy data in a proxy data storage. On the basis of the proxy data registered to the proxy data storage, a communication proxy generates a proxy transmission message and causes a transmitter to transmit the proxy transmission message.

8 Claims, 18 Drawing Sheets

Fig. 2

| SOURCE ADDRESS | RECEPTION TIME | DESTINATION ADDRESS | TRANSMISSION MESSAGE | REPLY MESSAGE |
|---|---|---|---|---|
| 10.9.154.8 | 11:21 | 172.16.4.32 | <request> getState </request> | <state> noMail </state> |
| 10.9.154.8 | 11:22 | 172.16.4.32 | <request> getState </request> | <state> noMail </state> |
| 10.9.154.8 | 11:22 | 192.168.255.20 | ... | ... |
| 10.9.154.8 | 11:23 | 172.16.4.32 | <request> getState </request> | <state> noMail </state> |

Fig. 3

| REPLY-TO ADDRESS | PERIOD | DESTINATION ADDRESS | TRANSMISSION MESSAGE | ASSUMED REPLY MESSAGE |
|---|---|---|---|---|
| 10.9.154.8 | 1 min | 172.16.4.32 | <request> getState </request> | <state> noMail </state> |

| REPLY-TO ADDRESS | PERIOD | DESTINATION ADDRESS | TRANSMISSION MESSAGE | ASSUMED REPLY MESSAGE | MAX | C/W |
|---|---|---|---|---|---|---|
| 10.9.154.8 | 1 min | 172.16.4.32 | <request> getState </request> | <state> noMail </state> | 5 | 0 |

Fig. 7

| TERMINAL ADDRESS ~202 | RECEPTION TIME ~204 | TRANSMISSION MESSAGE ~208 | REPLY MESSAGE ~210 |
|---|---|---|---|
| 10.9.154.8 | 11:21 | <request> getState </request> | <state> noMail </state> |
| 10.9.154.8 | 11:22 | <request> getState </request> | <state> noMail </state> |
| 10.9.154.8 | 11:23 | <request> getState </request> | <state> noMail </state> |

Fig. 12

| TRANSMISSION TIME ~304 | DESTINATION ADDRESS ~306 | TRANSMISSION MESSAGE ~308 | REPLY MESSAGE ~310 |
|---|---|---|---|
| 11:21 | 172.16.4.32 | <request> getState </request> | <state> noMail </state> |
| 11:22 | 172.16.4.32 | <request> getState </request> | <state> noMail </state> |
| 11:23 | 172.16.4.32 | <request> getState </request> | <state> noMail </state> |

METHOD, APPARATUS, AND COMPUTER READABLE STORAGE MEDIUM FOR CONTROLLING COMMUNICATION

BACKGROUND

1. Field

The present invention relates to an apparatus for controlling communication, and more particularly, to a communication control method that can reduce an amount of communication performed by a terminal that accesses a server to receive a service.

2. Description of the Related Art

Various services have become available through access from terminals such as PCs (personal computers) and mobile phones to servers, with widespread use of the Internet. Such a service, however, involves frequent access from the terminal to the server to obtain the latest data, depending on how the service is used. As a result, the amount of communication increases. In particular, for a battery-powered terminal, such as a mobile phone, that uses a low-speed and low-capacity communication path, reduction of the amount of communication is a challenge. Although it is possible to incorporate measures for reducing the amount of communication into each application program on a terminal, such measures have to be incorporated on a case-by-case basis, and therefore, the reduction in the amount of communication can be achieved only by an application incorporating the reduction measures. Thus, there is a need for versatile measures that can reduce the amount of communication without modifying individual application programs. In order to address the need, a proxy server has been conceived (e.g., Japanese Laid-open Patent Publication No. 2006-293466). The proxy server receives, from a terminal, a content request including addresses of multiple access destinations, transmits the received content request as content requests for the individual addresses, and transmits response messages as a single response message to the terminal. In this case, the terminal transmits, as one communication message, multiple communication messages for different destinations, and receives, as one response message, multiple response messages from different transmission sources.

In the method discussed in Japanese Laid-open Patent Publication No. 2006-293466, since it is necessary to modify both the terminal and the proxy server, the modification scale becomes large and the modification cost increases. In addition, the effect for reducing the amount of communication can be obtained only between the modified terminal and the modified proxy server.

SUMMARY

Accordingly, an object of the present invention is to provide a communication control method that can reduce the modification cost by limiting the range of the modification to a single apparatus.

According to an aspect of the present invention, provided is a communication control method executed by a communication relay apparatus for relaying communication messages. The communication relay apparatus has a communication data storage for storing first data regarding relayed communication messages. The method includes: storing the first data regarding the relayed communication messages in the communication data storage, receiving a current communication message, determining, on the basis of the first data stored in the communication data storage, whether the current communication message satisfies a first predetermined condition, stopping relay of the current communication message satisfying the first predetermined condition, and continuing relay of the current communication message failing to satisfy the first predetermined condition.

The communication relay apparatus may relay communication messages exchanged between a first communication apparatus and a second communication apparatus. In such a situation, the first data may preferably regard first communication messages transmitted from the first communication apparatus to the second communication apparatus, and the operation of determining may be operated, on the basis of the first data regarding the first communication messages, when the current communication message is a second communication message transmitted from the second communication apparatus to the first communication apparatus.

The communication suppression method may further include: transmitting a proxy transmission message containing a description of the first communication messages to the second communication apparatus during a time period of stopping relay of the current communication message.

The communication relay apparatus may further have a proxy data storage for storing proxy data including a destination address and a description of the proxy transmission message. In such a configuration, the method may further include: generating the proxy transmission message on the basis of the proxy data stored in the proxy data storage.

The proxy data may further include a reply-to address and an assumed reply message. In such a configuration, the method may further include: transmitting to the reply-to address a reply message received for the proxy transmission message if the reply message does not match the assumed reply message.

The proxy data may further include a transmission interval of the proxy transmission message.

The communication relay apparatus may relay communication messages exchanged between a first communication apparatus and a second communication apparatus. In such a situation, the first data may preferably regard second communication messages transmitted from the second communication apparatus to the first communication apparatus, and the operation of determining may be operated, on the basis of the first data regarding the second communication messages, when the current communication message is a second communication message transmitted from the second communication apparatus to the first communication apparatus.

The first data may include at least one of descriptions of the relayed communication messages, sent times of the relayed communication messages, and received times of the relayed communication messages. In such a configuration, the operation of determining may include at least one of determining on the basis of the descriptions of the relayed communication messages, determining on the basis of the sent times of the relayed communication messages, and determining on the basis of the received times of the relayed communication messages.

The first predetermined condition may include at least one of that a description of the current communication message matches one of the descriptions of the relayed communication messages included in the first data, and that a sent time or a received time of the current communication message satisfies a third predetermined condition with the sent times or the received times of the relayed communication messages.

The operation of stopping relay may include at least one of stopping and canceling relay of the current communication message, and stopping relay of the current communication message to resume the relay upon satisfying a second predetermined condition.

The second predetermined condition may include elapse of a predetermined time after stopping relay of the current communication message.

BRIEF DESCRIPTION OF THE DRAWINGS

FIG. 2 is a diagram illustrating an example of a communication data table stored in a communication data storage of a communication control apparatus according to a first embodiment of the present invention;

FIG. 3 is a diagram illustrating an example of a proxy data table stored in a proxy data storage of a communication control apparatus according to a first embodiment of the present invention;

FIG. 7 is a diagram illustrating an example of a proxy data table stored in a proxy data storage of a communication control apparatus according to a second embodiment of the present invention;

FIG. 12 is a diagram illustrating an example of a communication data table stored in a communication data storage of a web mail server according to a fourth embodiment of the present invention;

DESCRIPTION OF THE PREFERRED EMBODIMENTS

Embodiments of the present invention will be discussed below with reference to the accompanying drawings.

First Embodiment

Figure 1:
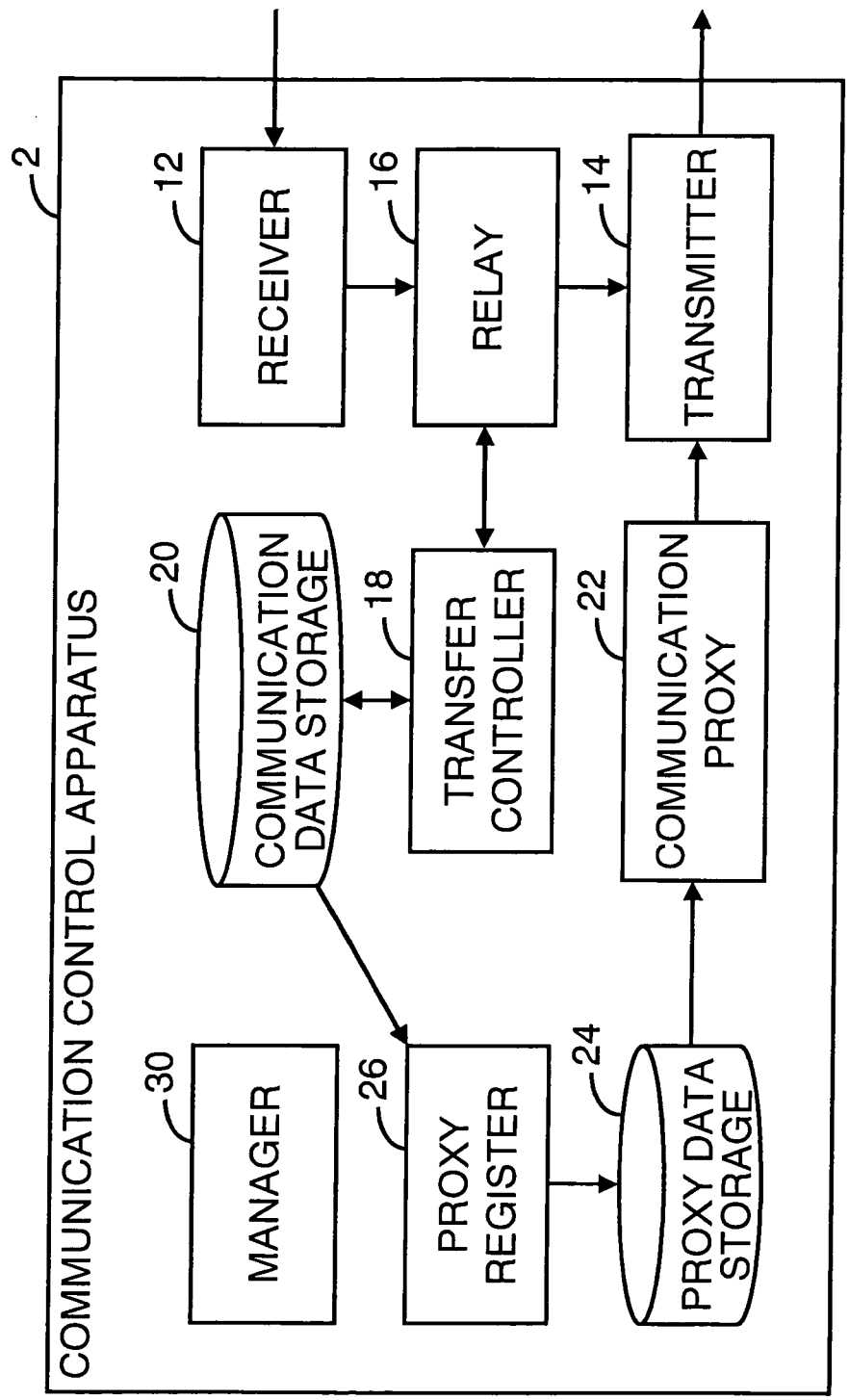
FIG. 1 is a block diagram illustrating a system configuration of a communication control apparatus according to a first embodiment of the present invention.

FIG. 1 is a block diagram illustrating a system configuration of a communication control apparatus according to a first embodiment of the present invention. A communication control apparatus 2 according to the first embodiment of the present invention includes a receiver 12 for receiving a communication message, a transmitter 14 for transmitting a communication message, and a relay 16 for relaying the communication message received by the receiver 12 by transferring the communication message to the transmitter 14. The communication control apparatus 2 further includes a transfer controller 18 for controlling the transfer performed by the relay 16, a communication data storage 20 for storing data regarding communication messages, a communication proxy 22 for causing the transmitter 14 to transmit a proxy transmission message, a proxy data storage 24 for storing proxy data regarding the proxy transmission message, a proxy register 26 for registering the proxy data, that is, generating and storing the proxy data in the proxy data storage 24, and a manager 30 for managing the entire communication control apparatus 2. On the basis of the data stored in the communication data storage 20, the transfer controller 18 determines whether or not the communication message received by the receiver 12 satisfies a predetermined condition. When the communication message received by the receiver 12 satisfies the predetermined condition, the transfer controller 18 stops and cancels the process for transferring the communication message performed by the relay 16. The transfer controller 18 stores, in the communication data storage 20, data regarding the communication message relayed by the relay 16. When the transfer controller 18 stops the transfer of the communication message, the proxy register 26 generates proxy data on the basis of the data stored in the communication data storage 20 and stores the generated proxy data in the proxy data storage 24. The communication proxy 22 generates a proxy transmission message on the basis of the proxy data stored in the proxy data storage 24 and causes the transmitter 14 to transmit the generated proxy transmission message. Among functions of the communication control apparatus 2, the manager 30 executes all functions that are not explicitly discussed herein, as well as functions of a typical communication relay apparatus.

The first embodiment of the present invention will now be discussed on the basis of a specific example. In the first embodiment of the present invention, it is assumed that a terminal accesses a web (WWW: World Wide Web) mail server. The terminal regularly (e.g., at one-minute interval) transmits, to the web mail server, a status query message for querying the presence/absence of new mail. In response, the web mail server transmits, to the terminal, a reply message indicating the presence/absence of new mail. When the communication control apparatus 2 relays the messages, the transfer controller 18 stores in the communication data storage 20 data regarding the messages.

FIG. 2 is a diagram illustrating an example of a communication data table stored in a communication data storage of a communication control apparatus according to a first embodiment of the present invention. Each entry of the communication data table shown in FIG. 2 contains data regarding a status query message transmitted from a specific terminal, such as Source Address 102, Reception Time 104, Destination Address 106, Transmission Message 108, and Reply Message 110. The Source Address 102 indicates an IP (internet protocol) address of a source terminal that has transmitted the status query message. The Source Address 102 may be any data that is capable of identifying the source terminal. The Reception Time 104 indicates a time at which the communication control apparatus 2 has received the status query message. Alternatively, the Reception Time 104 may be a time at which the terminal has transmitted the status query message. The Destination Address 106 indicates an IP address of a web mail server to which the status query message has been transmitted. The Destination Address 106 may also be any data that can identify the web mail server. The Transmission Message 108 indicates a description of the status query message transmitted from the terminal to the web mail server. The Reply Message 110 indicates a description of the reply message transmitted from the web mail server. The communication data table shown in FIG. 2 contains four entries of the data regarding the status query messages transmitted from the specific terminal. The Destination Addresses 106 of three of the four entries are the same IP address and the Reception Times 104 thereof are different from each other by one minute. That is, the status query messages for the same web mail server are received by the communication control apparatus 2 at one-minute interval. All of the Reply Messages 110 transmitted from the web mail server in response to the status query messages show the same data.

As in the example shown in FIG. 2, the status query messages for querying the presence/absence of new mail are transmitted at a regular interval in many cases. The descriptions of the reply messages in response to the status query messages have a stylized message indicating "no new mail" until new mail arrives. Thus, when new messages do not arrive frequently, the status query message and the stylized reply message indicating "no new mail" are repeatedly exchanged. Such repeated exchange of the messages will be referred to as "repeated communications". Since no new data is brought by the repeated communications, this means that a narrow communication path for the terminal is wastefully used and also power for the terminal is wastefully consumed for the repeated communications.

In the first embodiment of the present invention, the transfer controller 18 detects the repeated communications. That is, the transfer controller 18 detects that the same communication message is regularly transmitted from a specific communication apparatus to another specific communication apparatus and the same reply message is transmitted in response to the communication message. When the transfer controller 18 detects the repeated communications, the proxy register 26 generates proxy data on the basis of the data stored in the communication data storage 20 and stores the proxy data in the proxy data storage 24.

FIG. 3 is a diagram illustrating an example of a proxy data table stored in a proxy data storage of a communication control apparatus according to a first embodiment of the present invention. Each entry of the proxy data table shown in FIG. 3 contains data regarding status query messages regularly transmitted from a specific terminal to a web mail server, such as Reply-to Address 112, Period 114, Destination Address 116, Transmission Message 118, and Assumed Reply Message 120. The Reply-to Address 112 indicates an IP address of the terminal to which the reply message is transmitted, and is generated on the basis of the Source Address 102 shown in FIG. 2. The Period 114 indicates a time interval at which the status query messages are transmitted, and is generated in accordance with reception time intervals calculated on the basis of the Reception Times 104 shown in FIG. 2. The Destination Address 116 indicates an IP address of a web mail server to which the status query message is transmitted, and is generated in accordance with the Destination Address 106 shown in FIG. 2. The Transmission Message 118 indicates a description of the status query message to be transmitted, and is generated in accordance with the Transmission Message 108 shown in FIG. 2. The Assumed Reply Message 120 indicates a description of a stylized reply message received from the web mail server when no new mail arrives, and is generated in accordance with the Reply Message 110 shown in FIG. 2. The proxy data table shown in FIG. 3 contains one entry of data regarding the transmission message that is to be transmitted by proxy by the communication control apparatus 2.

In the first embodiment of the present invention, when the transfer controller 18 detects the repeated communications, the relay 16 does not relay the stylized reply message from the web mail server to the terminal, and then generates a status query message for the web mail server in place of the terminal and causes the transmitter 14 to transmit the generated status query message. In this case, in accordance with the data stored in the proxy data table shown in FIG. 3, the communication proxy 22 causes transmission of the status query message containing the description of the Transmission Message 118, at the time interval specified in the Period 114, to the web mail server identified with the Destination Address 116. When the description of the reply message transmitted from the web mail server in response to the status query message is the same as the description of the Assumed Reply Message 120, the communication proxy 22 repeats the process of proxy communication. Thereafter, when the communication control apparatus 2 receives a reply message whose description is different from the description of the Assumed Reply Message 120, the communication proxy 22 terminates the process of proxy communication and the communication control apparatus 2 relays the reply message to the terminal. While the communication proxy 22 repeats the process of proxy communication, the communication control apparatus 2 does not relay the reply messages and the terminal does not transmit a next status query message until it receives a reply message. Thus, it is possible to reduce the amount of communication performed by the terminal while the communication proxy 22 repeats the process of proxy communication.

Figure 4:
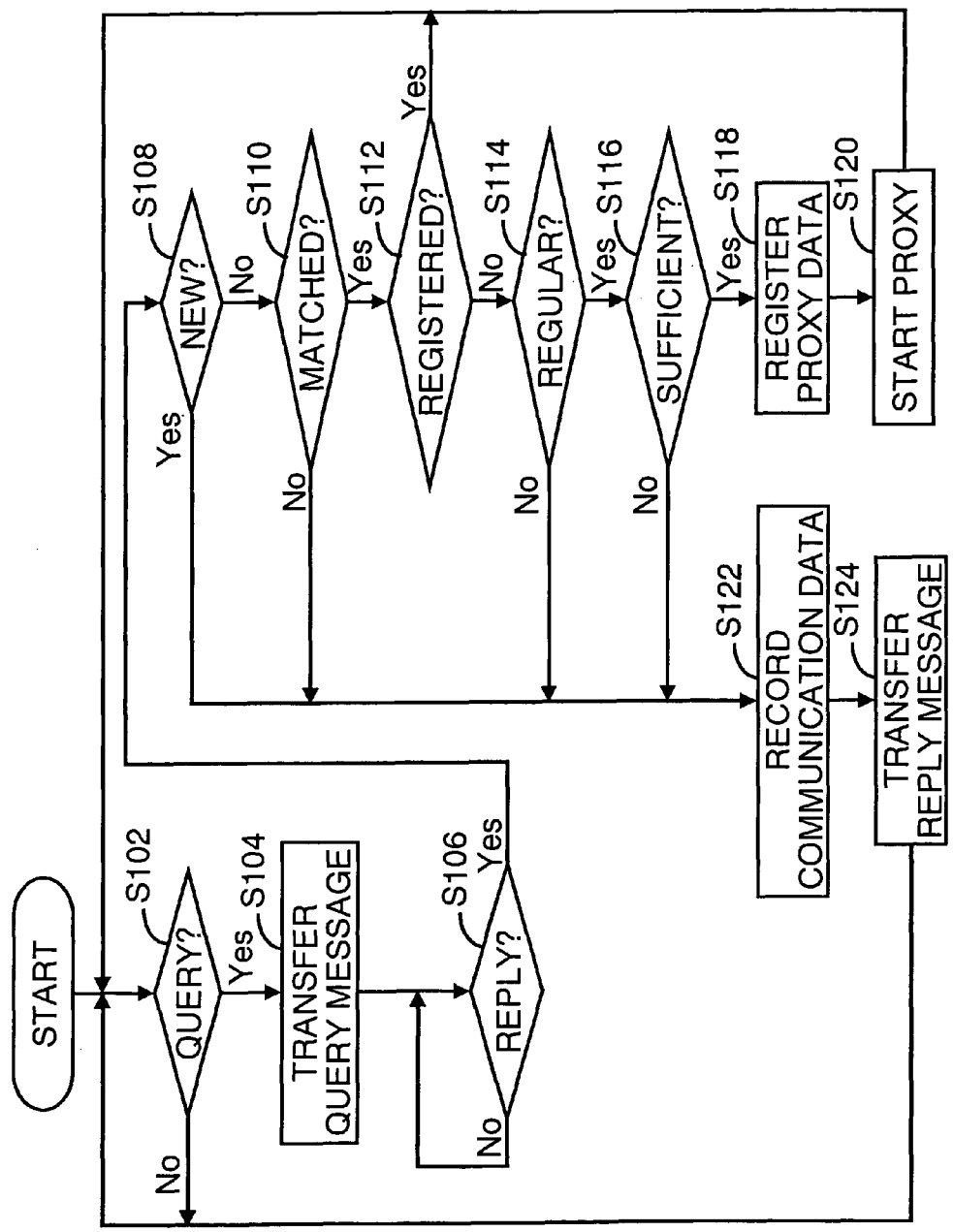
FIG. 4 is a diagram illustrating a flowchart of a process for determining repeated communications, which is performed by a communication control apparatus according to a first embodiment of the present invention.

FIG. 4 is a flowchart of a process for determining repeated communications, which is performed by the communication control apparatus 2 according to the first embodiment of the present invention. The flow of the process for determining repeated communications in the first embodiment of the present invention will now be discussed with reference to FIG. 4.

In Operation S102, the receiver 12 waits for a status query message from the terminal.

In Operation S104, when the receiver 12 receives the status query message (Yes in Operation S102), the relay 16 transfers the status query message to the transmitter 14 and the transmitter 14 transmits the status query message to a web mail server identified by a destination address contained in the status query message.

In Operation S106, the receiver 12 waits for a reply message from the web mail server.

In Operation S108, when the receiver 12 receives the reply message from the web mail server (Yes in Operation S106), the transfer controller 18 checks whether the status query message is a new message, i.e., no entry of the communication data table stored in the communication data storage 20 has the Source Address 102, Destination Address 106, and Transmission Message 108 that respectively match the source address, destination address, and transmission message of the status query message.

In Operation S110, when the status query message is not a new message (No in Operation S108), i.e., when any entries having the Source Address 102, Destination Address 106, and Transmission Message 108 that respectively match the source address, destination address, and transmission message of the status query message are stored in the communication data storage 20, the transfer controller 18 compares the description of the Reply Message 110 of the latest one of the entries with the description of the reply message received by the receiver 12.

Figure 5:
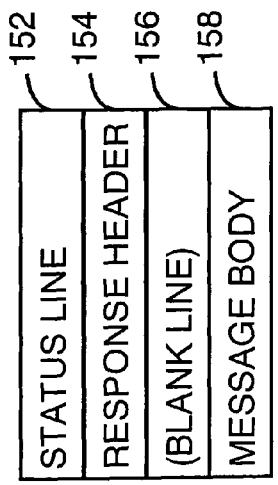
FIG. 5 is a diagram illustrating a data structure of an HTTP response.

FIG. 5 is a diagram illustrating a data structure of an HTTP (Hyper Text Transfer Protocol) response. An HTTP response contains a Status Line 152, Response Header 154, Blank Line 156, and Message Body 158. The Status Line 152 contains an HTTP version, a status code, and a description of a status. The Response Header 154 may contain one or more lines. The Blank Line 156 is data for delimiting the Response Header 154 and the Message Body 158. The Message Body 158 may contain one or more lines. When the reply message is an HTTP response, the Message Body 158 is regarded as the Reply Message 110. When a Message Body 158 contains data such as date or time, even Message Bodies 158 showing the same message "no new mail" may not match with each other due to a difference in time. In order to deal with the problem, some methods are available. One method is to register a format for a date representation or time representation, so that when a representation that complies with the format is found in the Message Body 158, the representation is excluded from comparison. For examples, when a format in which the time is expressed by hh:mm:ss is used, wherein the hour is expressed by two-digit integers from 00 to 23, the minute is expressed by two-digit integers from 00 to 59, and the second is expressed by two-digit integers from 00 to 59, a representation, in the Message Body 158, which matches the format is excluded from comparison. Since a numeric value that increases by one for each response is highly likely to be a sequence number, the numeric value may be excluded from comparison. Also, since a numeric value that increases for each response by the number of seconds of an elapsed time or is closer to a multiple thereof is highly likely to be a time that is expressed by the numeric value, the numeric value may be excluded from comparison. Alternatively, all numeric characters in the Message Body 158 may be replaced with "0s". In many cases, the dates, times, sequence numbers, and so on are different only in numeric characters. Thus, when the main message description is the same, the replacement of the numeric characters with "0s" may provide the same Message Body 158.

In Operation S112, when the description of the Reply Message 110 of the latest entry matches the description of the reply message received by the receiver 12 (Yes in Operation S110), the transfer controller 18 checks whether or not proxy data for the status query message is registered to the proxy data storage 24. That is, the transfer controller 18 checks whether or not any entries having the Reply-to Address 112, Destination Address 116, and Transmission Message 118 that respectively match the source address, destination address, and transmission message of the status query message are stored in the proxy data storage 24. When the proxy data for the status query message has been registered to the proxy data storage 24 (Yes in Operation S112), the process for determining repeated communications returns to Operation S102.

In Operation S114, when the proxy data for the status query message is not registered to the proxy data storage 24 (No in Operation S112), out of the entries of the communication data table stored in the communication data storage 20, the transfer controller 18 checks regularity of the reception intervals of the entries having the Source Address 102, Destination Address 106, and Transmission Message 108 that respectively match the source address, destination address, and transmission message of the status query message.

A discussion will now be given on a method for determining regularity of the reception intervals. A reception interval between each individual status query message and the previous status query message is determined on the basis of the Reception Time 104 shown in FIG. 2. An average reception interval is determined on the basis of the determined reception intervals to determine differences between each reception interval and the average reception interval. When all differences fall within a predetermined value, it is determined that the reception intervals are regular. The method for determining regularity of the reception intervals is not limited to this particular method. That is, any method may be used as long as it can determine that the reception intervals are substantially equal to each other.

In Operation S116, when it is determined that the reception intervals are regular (Yes in Operation S114), the transfer controller 18 checks whether or not the number of entries used for determining regularity of the reception intervals has reached a predetermined number (e.g., five).

In Operation S118, when the number of entries used for determining regularity of the reception intervals has reached the predetermined number (Yes in Operation S116), the proxy register 26 generates proxy data for the status query message and registers the proxy data to the proxy data storage 24. In this case, the average reception interval determined in Operation S114 is stored as the Period 114 of the proxy data. The receiver 12 deletes, from a reception buffer, the reply message for the status query message.

In Operation S120, the communication proxy 22 starts a process of proxy communication in accordance with the proxy data registered to the proxy data storage 24 in Operation S118, and the process for determining repeated communications returns to Operation S102.

In Operation S122, when the status query message is a new message (Yes in Operation S108), when the description of the Reply Message 110 of the latest entry does not match the description of the reply message received by the receiver 12 (No in Operation S110), when it is determined that the reception intervals are not regular (No in Operation S114), or when the number of entries used for determining regularity of the reception intervals has not reached the predetermined number (No in Operation S116), the transfer controller 18 records communication data by generating an entry for the status query message and adding the entry to the communication data table stored in the communication data storage 20.

In Operation S124, the relay 16 transfers the reply message to the transmitter 14, and the transmitter 14 transmits the reply message to the terminal that is the destination of the reply message. Thereafter, the process for determining repeated communications returns to Operation S102.

Figure 6:
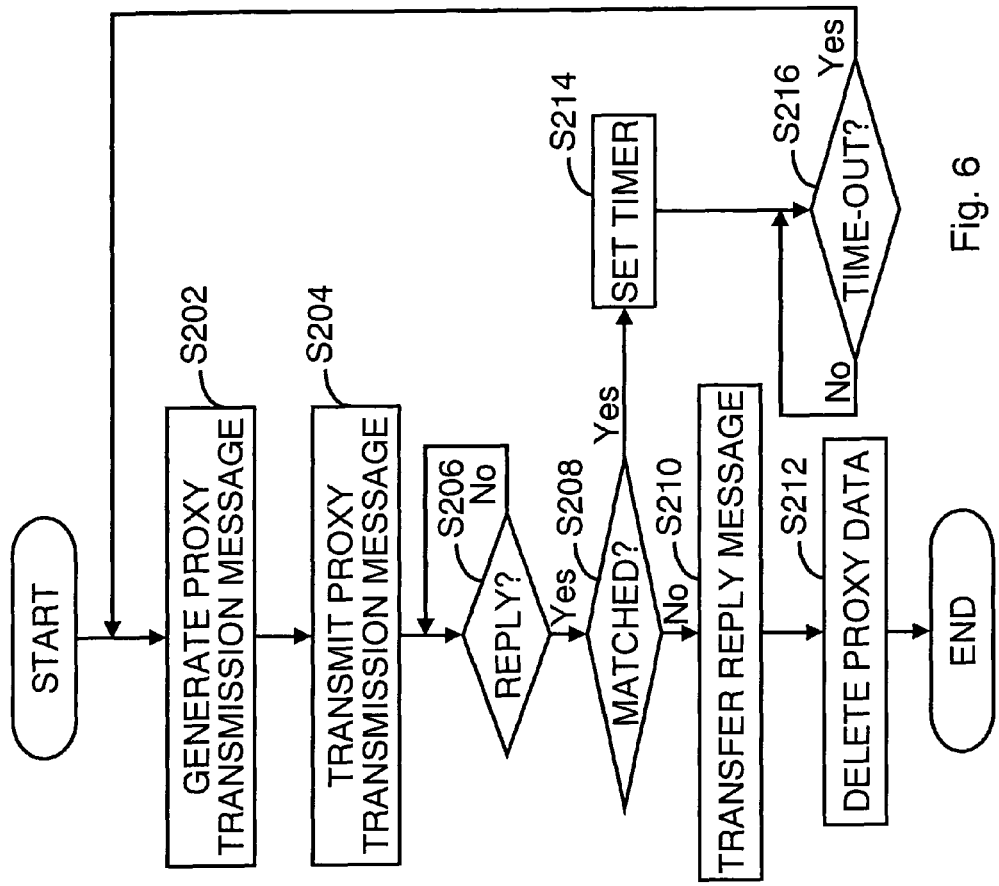
FIG. 6 is a diagram illustrating a flowchart of a process of proxy communication performed by a communication control apparatus according to a first embodiment of the present invention.

FIG. 6 is a diagram illustrating a flowchart of a process of proxy communication performed by a communication control apparatus according to a first embodiment of the present invention. The flow of the process of proxy communication in the first embodiment of the present invention will now be discussed with reference to FIG. 6.

In Operation S202, the communication proxy 22 generates a proxy transmission message on the basis of the proxy data registered to the proxy data storage 24.

In Operation S204, the communication proxy 22 causes the transmitter 14 to transmit the proxy transmission message.

In Operation S206, the receiver 12 waits for a reply message from the web mail server.

In Operation S208, when the receiver 12 receives the reply message from the web mail server (Yes in Operation S206), the transfer controller 18 compares the description of the reply message received by the receiver 12 with the description of the Assumed Reply Message 120 of the proxy data registered to the proxy data storage 24.

In Operation S210, when the description of the reply message received by the receiver 12 does not match the description of the Assumed Reply Message 120 of the proxy data registered to the proxy data storage 24 (No in Operation S208), the relay 16 transfers the reply message to the transmitter 14 and the transmitter 14 transmits the reply message to a terminal identified with the Reply-to Address 112.

In Operation S212, the proxy register 26 deletes the proxy data registered to the proxy data storage 24, and the process of proxy communication ends.

In Operation S214, when the description of the reply message received by the receiver 12 matches the description of the Assumed Reply Message 120 of the proxy data registered to the proxy data storage 24 (Yes in Operation S208), the communication proxy 22 sets a timer with the time registered as the Period 114, and the receiver 12 deletes the reply message from the reception buffer.

In Operation S216, the timer counts the set time. When the set time has elapsed (Yes in Operation S216), the process of proxy communication returns to Operation S202.

As discussed above, according to the first embodiment of the present invention, when the communication control apparatus detects the repeated communications of the status query messages from the terminal and the stylized reply messages from the web mail server, the communication control apparatus, in place of the terminal, transmits the status query message to the web mail server. Further, only when the description of the reply message from the web mail server changes, the communication control apparatus transmits the reply message to the terminal. Thus, it is possible to reduce the amount of communication performed by the terminal.

In the first embodiment of the present invention, it is assumed that the status query message is transmitted at regular transmission intervals. In practice, however, the terminal itself may adjust the transmission intervals in order to reduce the amount of communication. For example, upon receiving a reply message indicating "no new mail" in response to a first query, the terminal transmits a second query after a predetermined time has elapsed, and then, upon receiving a reply message indicating "no new mail" again, the terminal transmits a next query after n times the predetermined time has elapsed. In order to deal with such a case, instead of determining regularity of the reception intervals in Operation S114, a determination may be made as to whether or not changes in the reception intervals match a prepared model for adjusting the transmission intervals. When the changes match the model, the process of proxy communication is performed. The transmission intervals in the process of proxy communication may be adjusted in accordance with the model.

The process of proxy communication may be performed only when it is determined that the communication environment deteriorates, rather than being performed on a steady basis. Such an arrangement may reduce the loads of the communication control apparatus in normal times.

Second Embodiment

In the above-discussed first embodiment of the present invention, no reply message is relayed from the web mail server to the terminal during execution of the process of proxy communication. Thus, the terminal may transmit a new status query message upon expiration of waiting time for reply message. Accordingly, in a second embodiment of the present invention, the time for the process of proxy communications or the number of proxy transmissions is limited, and when the limit is exceeded, the process of proxy communication is terminated.

FIG. 7 is a diagram illustrating an example of a proxy data table stored in a proxy data storage in a communication control apparatus according to a second embodiment of the present invention. The entry of the proxy data table shown in FIG. 7 differs from the entry of the proxy data table shown in FIG. 3 in that a Max 122 and a C/W 124 are added. The Max 122 indicates a limit on the number of proxy transmissions that are successively performed. The C/W 124 indicates the number of proxy transmissions actually executed, and the default is "0".

Figure 8:
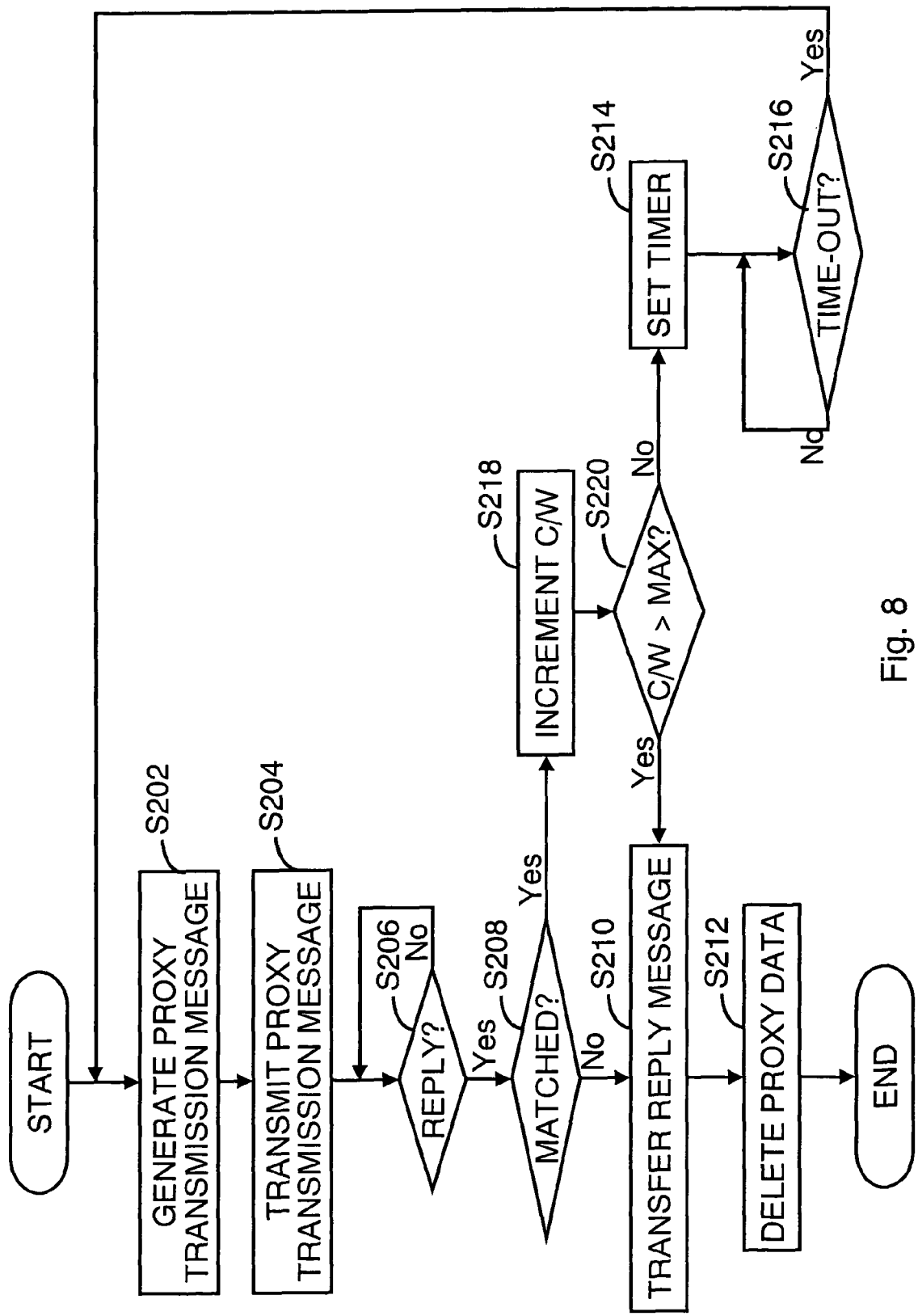
FIG. 8 is a diagram illustrating a flowchart of a process of proxy communication performed by a communication control apparatus according to a second embodiment of the present invention.

FIG. 8 is a diagram illustrating a flowchart of a process of proxy communication performed by a communication control apparatus according to a second embodiment of the present invention. The flowchart shown in FIG. 8 differs from the flowchart shown in FIG. 6 in that Operations S218 and S220 are added. In the flow of the process of proxy communication in the second embodiment of the present invention, the operations added to the flowchart shown in FIG. 6 will now be discussed with reference to FIG. 8. The system configuration of the communication control apparatus according to the second embodiment of the present invention is similar to the system configuration shown in FIG. 1.

In Operation S218, when the description of the reply message received by the receiver 12 matches the description of the Assumed Reply Message 120 of the proxy data registered to the proxy data storage 24 (Yes in Operation S208), the communication proxy 22 increments the value of the C/W 124 by "1".

In Operation S220, the communication proxy 22 compares the value of the C/W 124 with the value of the Max 122. When the result of the comparison shows that the value of the C/W 124 is greater than the value of the Max 122, the process of proxy communication proceeds to Operation S210. When the value of the C/W 124 is not greater, the process of proxy communication proceeds to Operation S214.

As discussed above, according to the second embodiment of the present invention, an appropriate limitation is put on the number of proxy transmissions. Thus, a reply message from the web mail server can be relayed before the waiting time for reply message expires in the terminal.

The Max 122 and C/W 124 may indicate the time for the process of proxy communications, instead of the number of proxy transmissions.

Third Embodiment

In a third embodiment of the present invention, the relay of the reply message from the web mail server to the terminal is delayed without performing the process of proxy communication discussed in the first embodiment of the present invention, to thereby reduce the amount of communication performed by the terminal.

Figure 9:
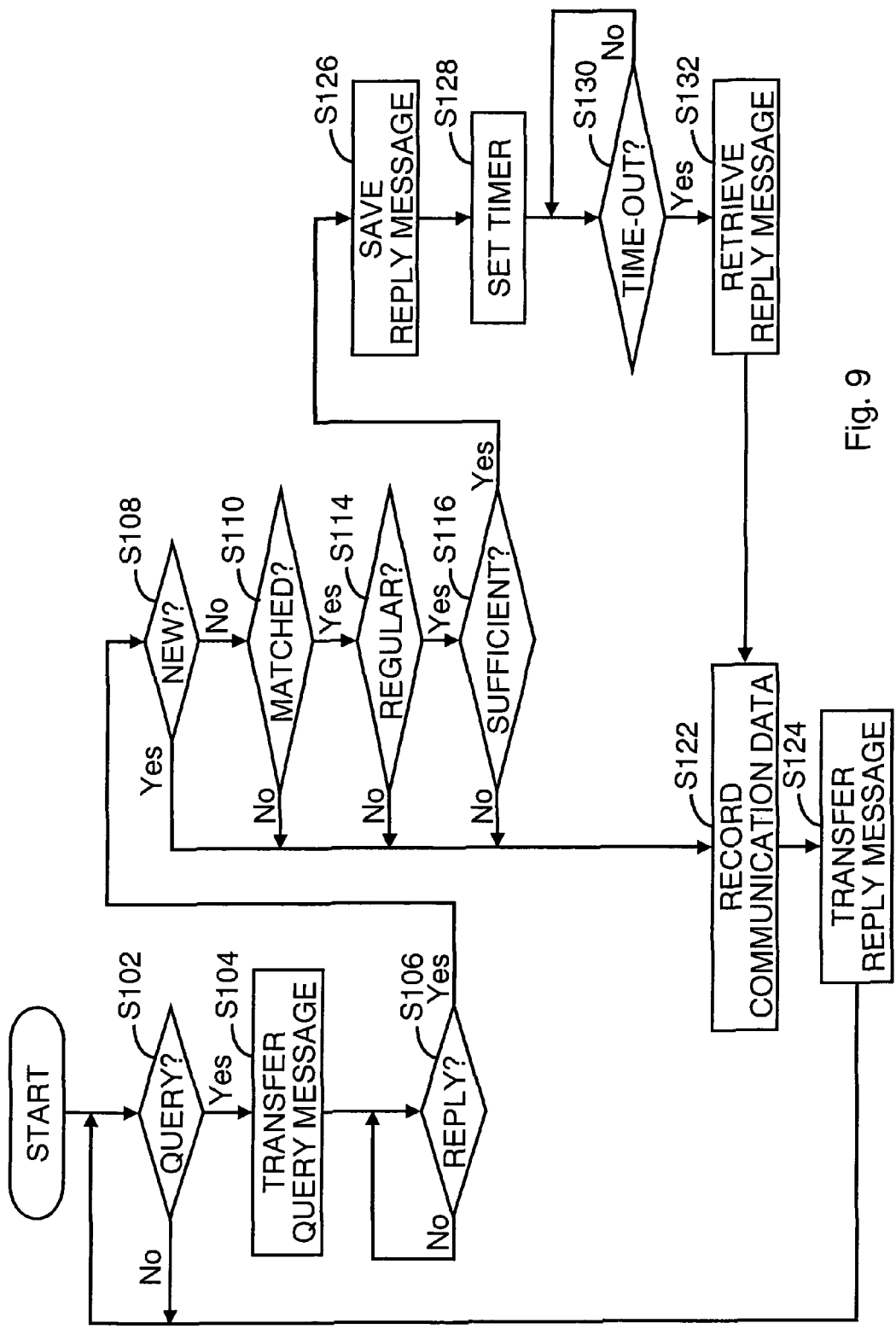
FIG. 9 is a diagram illustrating a flowchart of a process for delaying relay, which is performed by a communication control apparatus according to a third embodiment of the present invention.
Figure 10:
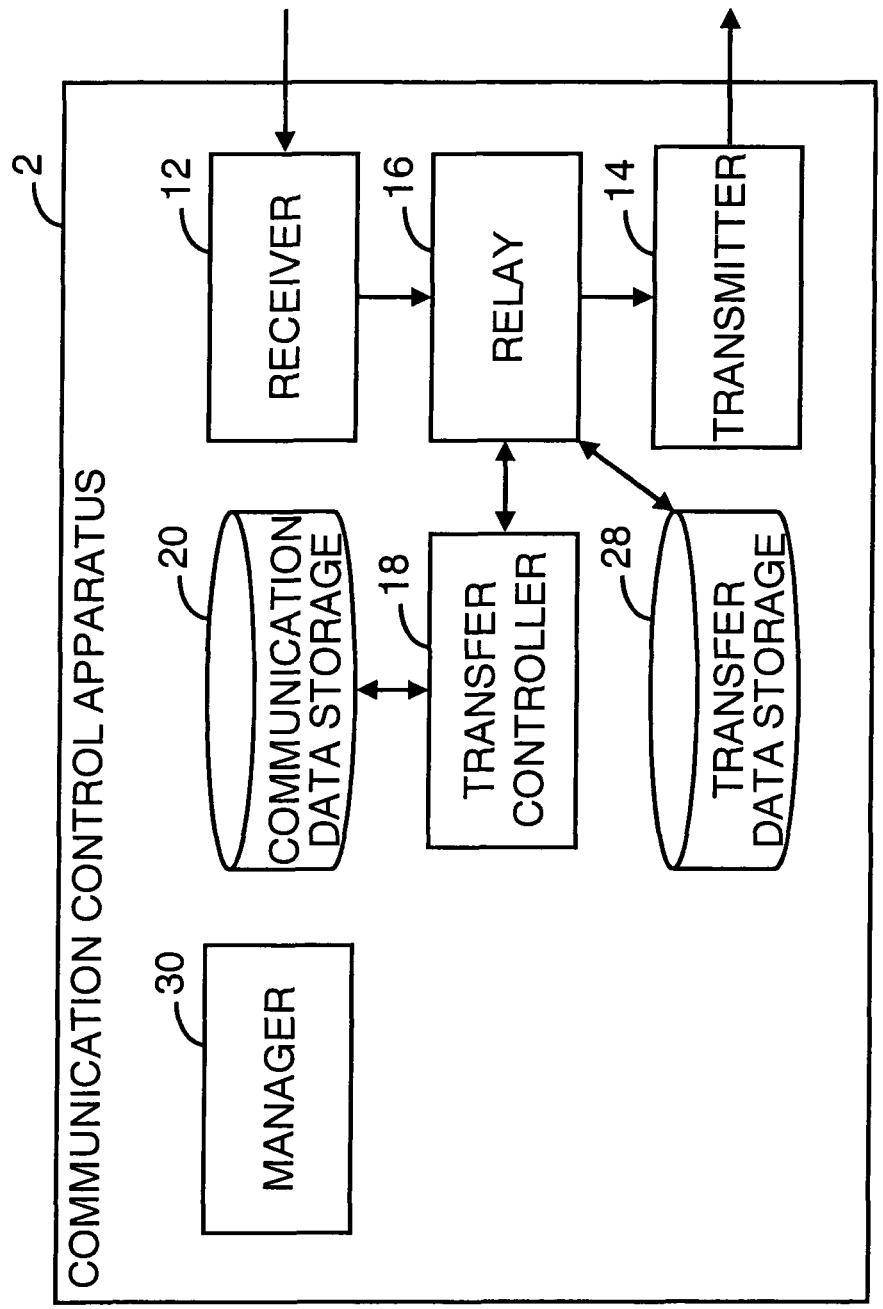
FIG. 10 is a block diagram illustrating a system configuration of a communication control apparatus according to a third embodiment of the present invention.

FIG. 9 is a diagram illustrating a flowchart of a process for delaying relay, which is performed by a communication control apparatus according to a third embodiment of the present invention. The flowchart shown in FIG. 9 differs from the flowchart shown in FIG. 4 in that Operations S112, S118, and S120 are deleted and Operations S126 to S132 are added. FIG. 10 is a block diagram illustrating a system configuration of a communication control apparatus according to a third embodiment of the present invention. The system configuration shown in FIG. 10 differs from the system configuration shown in FIG. 1 in that the proxy data storage 24 and the proxy register 26 are deleted and a transfer data storage 28 is added. The transfer data storage 28 stores a reply message received from the web mail server. In the flow of the process for delaying relay in the third embodiment of the present invention, the operations added to the flowchart shown in FIG. 4 will now be discussed with reference to FIG. 9.

In Operation S126, when the number of entries used for determining regularity of the reception intervals has reached the predetermined number (Yes in Operation S116), the relay 16 saves the reply message in the transfer data storage 28, and the receiver 12 deletes the reply message from the reception buffer.

In Operation S128, the transfer controller 18 sets a timer with a predetermined time.

In Operation S130, the timer counts the set time.

In Operation S132, when the set time has elapsed (Yes in Operation S130), the relay 16 retrieves the saved reply message from the transfer data storage 28 to write the reply message back to the reception buffer and deletes the retrieved reply message from the transfer data storage 28. Thereafter, the process for delaying relay proceeds to Operation S122.

That is, after a predetermined number of repeated communications is detected, the relay of the reply message is delayed by a predetermined time. This reduces the amount of communication performed by the terminal.

Compared to the first embodiment of the present invention, as shown in FIG. 10, the system configuration of the communication control apparatus according to the third embodiment of the present invention is simplified and the loads thereof are also reduced.

Fourth Embodiment

In the fourth embodiment of the present invention, the web mail server is responsible for the communication control function.

Figure 11:
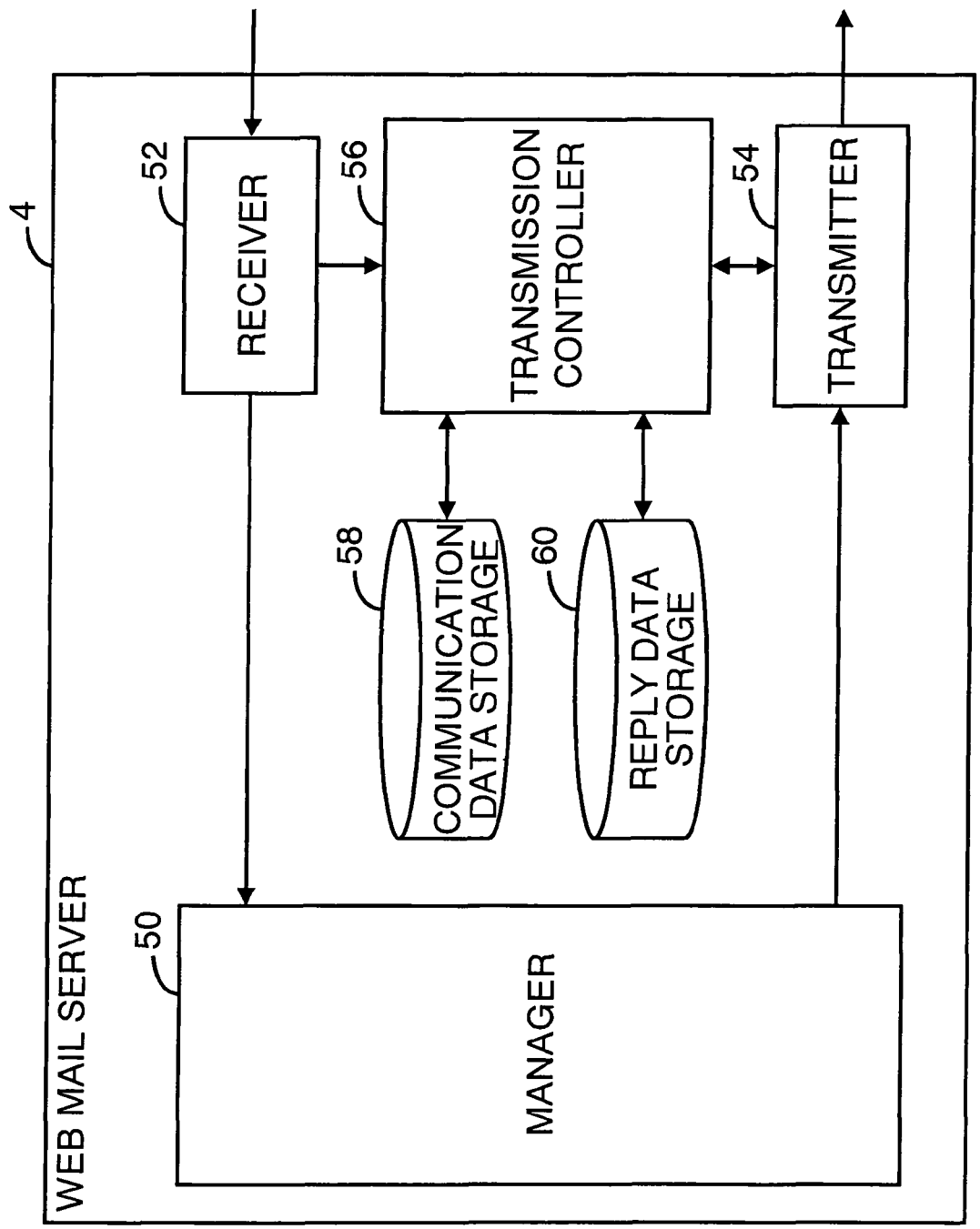
FIG. 11 is a block diagram illustrating a system configuration of a web mail server according to a fourth embodiment of the present invention.

FIG. 11 is a block diagram illustrating a system configuration of a web mail server according to a fourth embodiment of the present invention.

A web mail server 4 according to the fourth embodiment of the present invention includes a receiver 52 for receiving a communication message, a transmitter 54 for transmitting a communication message, a transmission controller 56 for controlling transmission performed by the transmitter 54, a communication data storage 58 for storing data regarding the communication messages, a reply data storage 60 for temporarily saving a reply message, and a manager 50 for managing the entire web mail server 4. On the basis of the data stored in the communication data storage 58, the transmission controller 56 determines whether or not a communication message received by the receiver 52 satisfies a predetermined condition. When the communication message received by the receiver 52 satisfies the predetermined condition, the transmission controller 56 stops transmission of a reply message performed by the transmitter 54. The transmission controller 56 stores, in the communication data storage 58, data regarding the communication message received by the receiver 52. Upon stopping the transmission of the reply message, the transmission controller 56 reads the reply message from a transmission buffer and saves the reply message in the reply data storage 60. Thereafter, the transmitter 54 deletes the reply message from the transmission buffer. After a predetermined time has elapsed, the transmission controller 56 retrieves the reply message from the reply data storage 60 and writes the reply message to the transmission buffer. Thereafter, the transmission controller 56 deletes the reply message from the reply data storage 60. The transmitter 54 transmits the reply message in the transmission buffer. Among functions of the web mail server 4, the manager 50 executes all functions that are not explicitly discussed herein, as well as functions of a typical web mail server.

The fourth embodiment of the present invention will now be discussed on the basis of a specific example.

FIG. 12 is a diagram illustrating an example of a communication data table stored in a communication data storage of a web mail server according to a fourth embodiment of the present invention. Each entry of the communication data table shown in FIG. 12 contains data regarding a status query message transmitted from a specific terminal, such as Terminal Address 202, Reception Time 204, Transmission Message 208, and Reply Message 210. The Terminal Address 202 indicates an IP address of a source terminal that has transmitted the status query message. The Terminal Address 202 may be any data that is capable of identifying the source terminal. The Reception Time 204 indicates a time at which the web mail server 4 has received the status query message. Alternatively, the Reception Time 204 may be a time at which the terminal has transmitted the status query message. The Transmission Message 208 indicates a description of the status query message transmitted from the terminal to the web mail server 4. The Reply Message 210 indicates a description of the reply message transmitted from the web mail server 4. The communication data table shown in FIG. 12 contains three entries of the data regarding the status query messages transmitted from the specific terminal, and the Reception Times 204 thereof are different from each other by one minute. That is, the status query messages transmitted from the same terminal are received by the web mail server 4 at one-minute interval. All of the Reply Messages 210 transmitted from the web mail server 4 in response to the status query messages show the same data.

In the fourth embodiment of the present invention, the transmission controller 56 detects the repeated communications. That is, the transmission controller 56 detects that the same communication message is regularly transmitted from a specific terminal and the same reply message is transmitted from the web mail server 4 in response to the communication message. Upon detecting the repeated communications, the transmission controller 56 delays transmission of the reply message from the web mail server 4 to the terminal. This reduces the amount of communication performed by the terminal.

In the fourth embodiment of the present invention, upon detecting the repeated communications, the transmission controller 56 does not permit immediate transmission of the reply message from the transmitter 54, but permits delayed transmission of the reply message from the transmitter 54 after a predetermined time has elapsed. Thus, the transmission of the reply message to the terminal is delayed. This reduces the amount of communication performed by the terminal.

Figure 13:
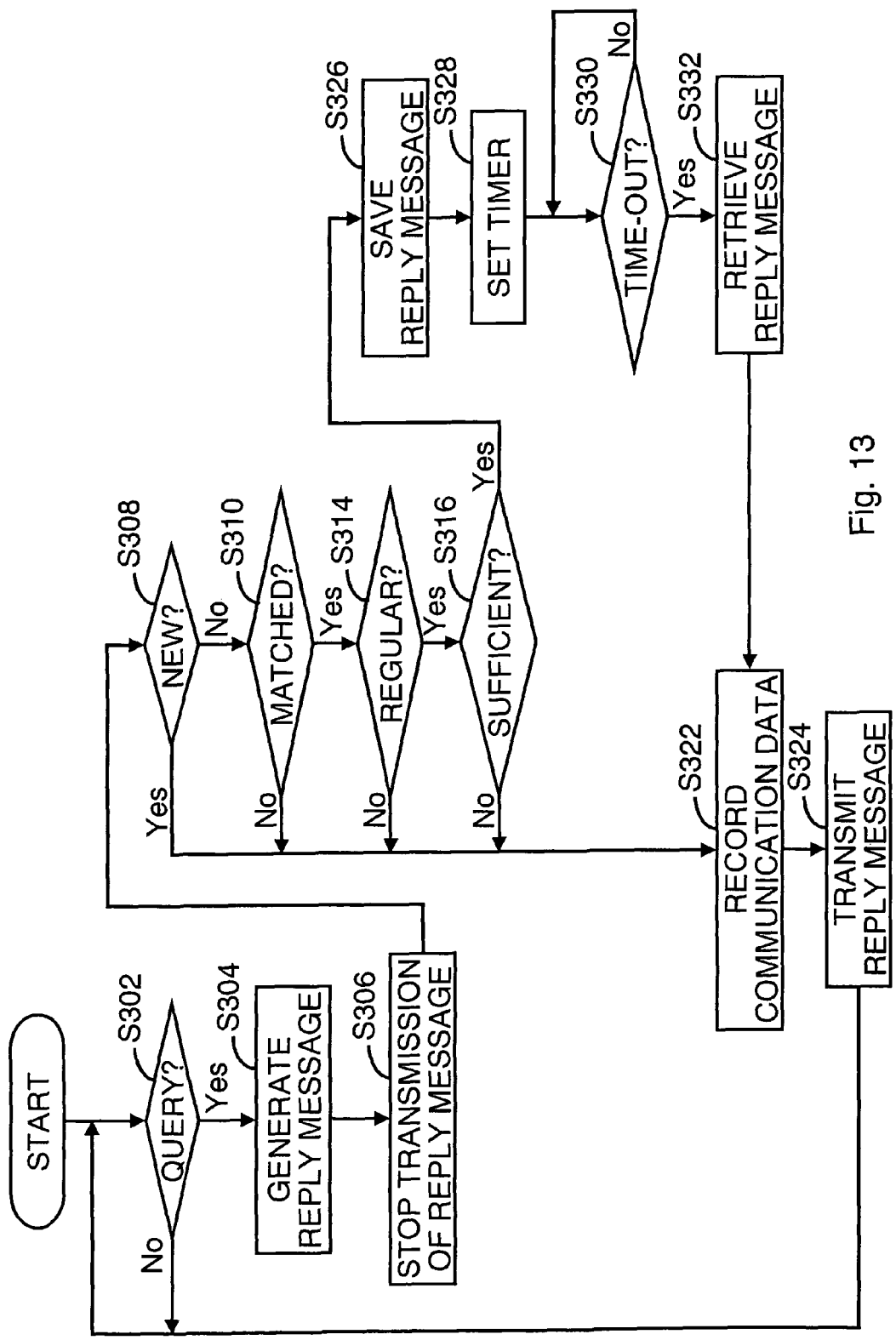
FIG. 13 is a diagram illustrating a flowchart of a process for delaying transmission, which is performed by a web mail server according to a fourth embodiment of the present invention.

FIG. 13 is a diagram illustrating a flowchart of a process for delaying transmission, which is performed by a web mail server according to a fourth embodiment of the present invention. The flow of the process for delaying transmission in the fourth embodiment of the present invention will now be discussed with reference to FIG. 13.

In Operation S302, the receiver 52 waits for a status query message from a terminal.

In Operation S304, when the receiver 52 receives the status query message (Yes in Operation S302), the manager 50 generates a reply message for the status query message and sends the reply message to the transmitter 54.

In Operation S306, the transmission controller 56 temporarily stops transmission of the reply message from the transmitter 54.

In Operation S308, the transmission controller 56 checks whether the status query message is a new message, i.e., no entry of the communication data storage 58 has the Terminal Address 202 and Transmission Message 208 that respectively match the source address and the transmission message of the status query message.

In Operation S310, when the status query message is not a new message (No in Operation S308), i.e., when any entries having the Terminal Address 202 and Transmission Message 208 that respectively match the source address and the transmission message of the status query message are stored in the communication data storage 58, the transmission controller 56 compares the description of the Reply Message 210 of the latest one of the entries with the description of the reply message in a transmission buffer.

In Operation S314, when the description of the Reply Message 210 of the latest entry matches the description of the reply message in the transmission buffer (Yes in Operation S310), out of the entries of the communication data table stored in the communication data storage 58, the transmission controller 56 checks regularity of the reception intervals of the entries having the Terminal Address 202 and the Transmission Message 208 that respectively match the source address and the transmission message of the status query message.

In Operation S316, when it is determined that the reception intervals are regular (Yes in Operation S314), the transmission controller 56 checks whether or not the number of entries used for determining regularity of the reception intervals has reached a predetermined number (e.g., five).

In Operation S322, when the status query message is a new message (Yes in Operation S308), when the description of the Reply Message 210 of the latest entry does not match the description of the reply message in the transmission buffer (No in Operation S310), when it is determined that the reception intervals are not regular (No in Operation S314), or when the number of entries used for determining regularity of the reception intervals has not reached the predetermined number (No in Operation S316), the transmission controller 56 records communication data by generating an entry for the status query message and adding the generated entry to the communication data table stored in the communication data storage 58.

In Operation S324, the transmission controller 56 causes the transmitter 54 to transmit the reply message. Thereafter, the process for determining repeated communications returns to Operation S302.

In Operation S326, when the number of entries used for determining regularity of the reception intervals has reached the predetermined number (Yes in Operation S316), the transmission controller 56 saves the reply message in the reply data storage 60, and the transmitter 54 deletes the reply message from the transmission buffer.

In Operation S328, the transmission controller 56 sets a timer with a predetermined time.

In Operation S330, the timer counts the set time.

In Operation S332, when the set time has elapsed (Yes in Operation S330), the transmission controller 56 retrieves the saved reply message from the reply data storage 60 to write the reply message back to the transmission buffer and deletes the retrieved reply message from the reply data storage 60. Thereafter, the process for delaying transmission proceeds to Operation S322.

According to the fourth embodiment of the present invention, it is possible to delay the reply message without modifying an application program for a web mail service.

Although the fourth embodiment of the present invention has been given of an example of a web mail server, a service provided by the server is not limited to a web mail service. Thus, the communication control method according to the fourth embodiment of the present invention is applicable to a service server that provides any service.

Fifth Embodiment

In a fifth embodiment, the terminal is responsible for the communication control function.

Figure 14:
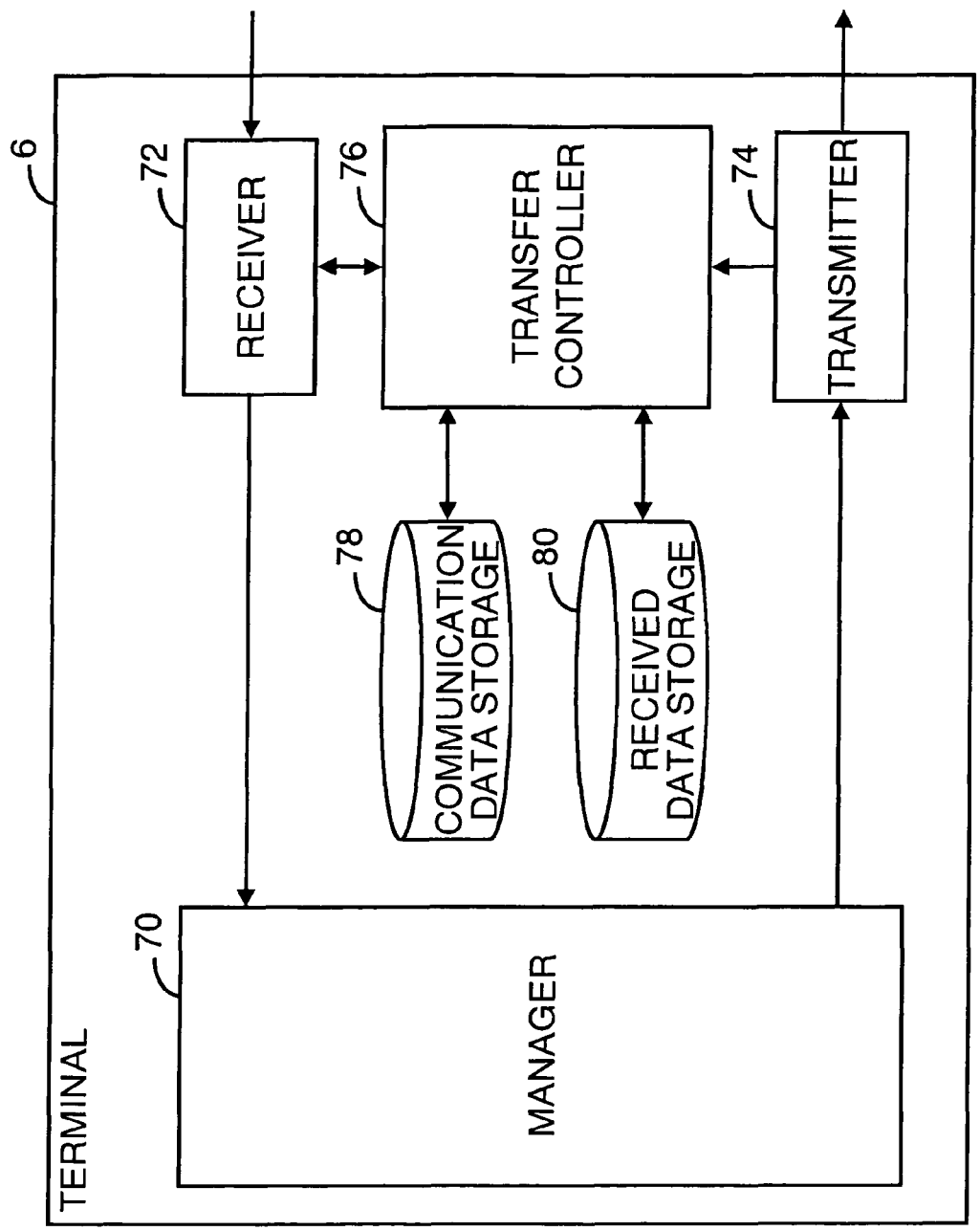
FIG. 14 is a block diagram illustrating a system configuration of a terminal according to a fifth embodiment of the present invention.

FIG. 14 is a block diagram illustrating a system configuration of a terminal according to a fifth embodiment of the present invention.

A terminal 6 according to the fifth embodiment of the present invention includes a receiver 72 for receiving a communication message, a transmitter 74 for transmitting a communication message, a transfer controller 76 for controlling transfer from the receiver 72 of a received message, a communication data storage 78 for storing data regarding communication messages, a received data storage 80 for temporarily saving the received message, and a manager 70 for managing the entire terminal 6. The transfer controller 76 determines, on the basis of the data stored in the communication data storage 78, whether or not the communication message received by the receiver 72 satisfies a predetermined condition. When the communication message received by the receiver 72 satisfies the predetermined condition, the transfer controller 76 stops transfer from the receiver 72 of the received message. The transfer controller 76 stores, in the communication data storage 78, data regarding the communication message received by the receiver 72. Upon stopping the transfer of the received message, the transfer controller 76 reads the received message from a reception buffer and saves the received message in the received data storage 80. Thereafter, the receiver 72 deletes the received message from the reception buffer. After a predetermined time has elapsed, the transfer controller 76 retrieves the received message from the received data storage 80 and writes the received message back to the reception buffer. The transfer controller 76 then deletes the received message from the received data storage 80. The receiver 72 transfers the received message from the reception buffer to the manager 70. Among functions of the terminal 6, the manager 70 executes all functions that are not explicitly discussed herein, as well as functions of a typical terminal.

The fifth embodiment of the present invention will now be discussed on the basis of a specific example.

Figures 15, 16:
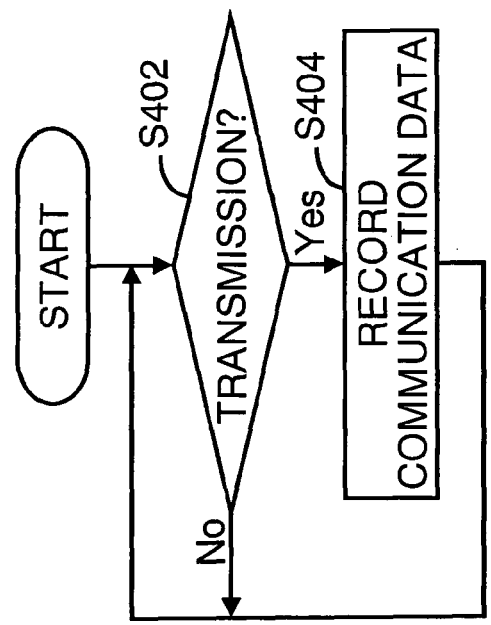
FIG. 15 is a diagram illustrating an example of a communication data table stored in a communication data storage of a terminal according to a fifth embodiment of the present invention.
FIG. 16 is a diagram illustrating a flowchart of a transmission process performed by a terminal according to a fifth embodiment of the present invention.

FIG. 15 is an example of a communication data table stored in the communication data storage in the terminal according to the fifth embodiment of the present invention. Each entry of the communication data table shown in FIG. 15 contains data regarding a reply message transmitted from a specific web mail server, such as Transmission Time 304, Destination Address 306, Transmission Message 308, and Reply Message 310. The Transmission Time 304 indicates a time at which the terminal has transmitted a status query message. Alternatively, the Transmission Time 304 may be a time at which the terminal 6 has received the reply message. The Destination Address 306 indicates an IP address of a web mail server that has transmitted the reply message. The Destination Address 306 may be any data that is capable of identifying the web mail server transmitted the reply message. The Transmission Message 308 indicates a description of a status query message transmitted from the terminal 6 to the web mail server. The Reply Message 310 indicates a description of the reply message transmitted from the web mail server. The communication data table shown in FIG. 15 contains three entries of the data regarding the reply messages transmitted from the specific web mail server, and the Transmission Times 304 thereof are different from each other by one minute. That is, the status query messages for the same web mail server are transmitted by the terminal 6 at one-minute interval. All of the Reply Messages 310 transmitted from the web mail server in response to the status query messages show the same data.

In the fifth embodiment of the present invention, the transfer controller 76 detects the repeated communications. That is, the transfer controller 76 detects that the same communication message is regularly transmitted from the terminal 6 and the same reply message is transmitted from the web mail server in response to the communication message. Upon detecting the repeated communications, the transfer controller 76 delays transfer of the reply message received from the web mail server to the manager 70. This reduces the amount of communication performed by the terminal 6.

In the fifth embodiment of the present invention, upon detecting the repeated communications, the transfer controller 76 does not permit immediate transfer of the received message from the receiver 72, but permits delayed transfer of the received message from the receiver 72 after a predetermined time has elapsed. Thus, the transfer of the received message to the manager 70 is delayed. This reduces the amount of communication performed by the terminal 6.

FIG. 16 is a diagram illustrating a flowchart of a transmission process performed by a terminal according to a fifth embodiment of the present invention. The flow of the transmission process in the fifth embodiment of the present invention will now be discussed with reference to FIG. 16.

In Operation S402, the transmitter 74 waits for a status query message from the manager 70.

In Operation S404, when the manager 70 transfers the status query message to the transmitter 74 (Yes in Operation S402), the transmitter 74 transmits the status query message. The transfer controller 76 records communication data by generating an entry for the status query message and adding the entry to the communication data table stored in the communication data storage 78. The generated entry contains Transmission Time 304, Destination Address 306, and Transmission Message 308, and does not contain Reply Messages 310.

Figure 17:
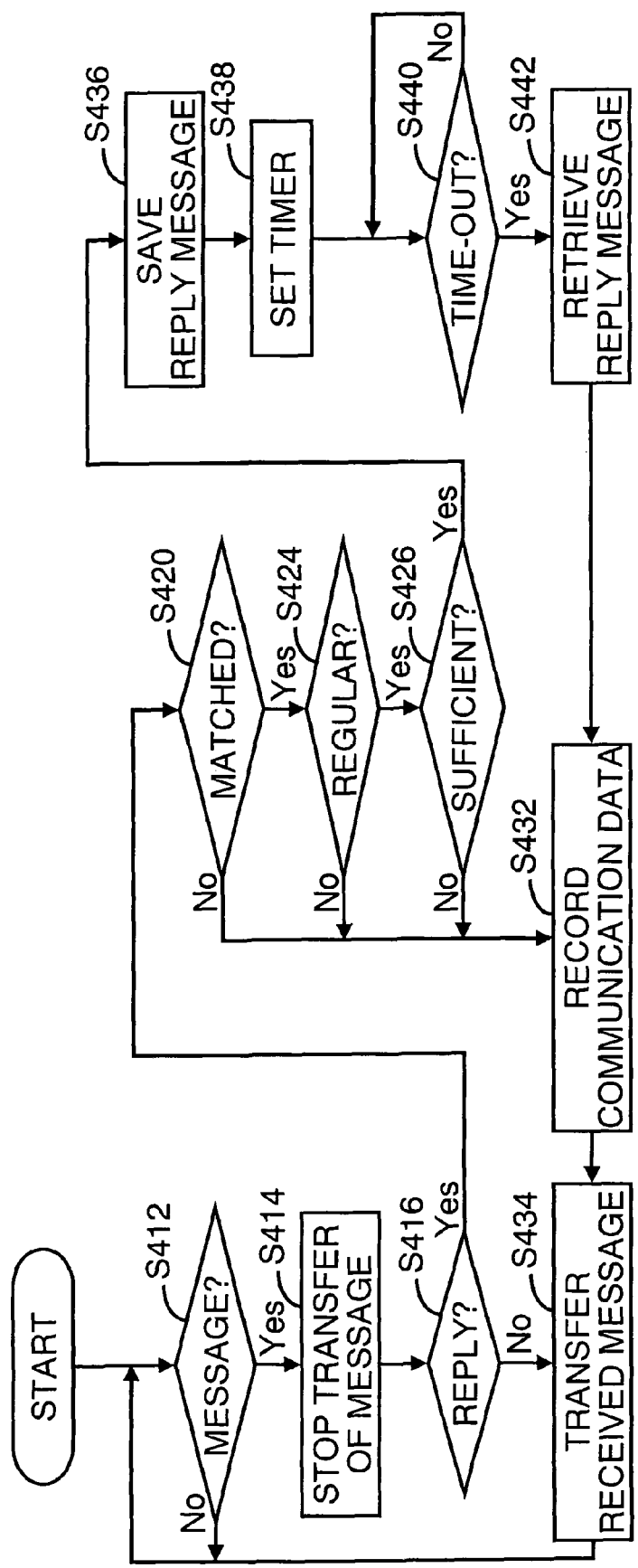
FIG. 17 is a diagram illustrating a flowchart of a process for delaying reception, which is performed by a terminal according to a fifth embodiment of the present invention.

FIG. 17 is a diagram illustrating a flowchart of a process for delaying reception, which is performed by a terminal according to a fifth embodiment of the present invention. The flow of the process for delaying reception in the fifth embodiment of the present invention will now be discussed with reference to FIG. 17.

In Operation S412, the receiver 72 waits for a reply message from the web mail server.

In Operation S414, when the receiver 72 receives a communication message (Yes in Operation S412), the transfer controller 76 temporarily stops transfer from the receiver 72 of the received communication message.

In Operation S416, the transfer controller 76 checks whether or not the received message is a reply message for a status query message corresponding to Transmission Message 308 of any entry of the communication data table stored in the communication data storage 78.

In Operation S420, when the received message is a reply message for a status query message corresponding to Transmission Message 308 of any entry of the communication data table stored in the communication data storage 78 (Yes in Operation S416), the transfer controller 76 compares the description of the Reply Message 310 of the latest entry with the description of the received message.

In Operation S424, when the description of the Reply Message 310 of the latest entry matches the description of the received message (Yes in Operation S420), out of the entries of the communication data table stored in the communication data storage 78, the transfer controller 76 checks regularity of the transmission intervals of the entries having the Destination Address 306 and the Transmission Message 308 that respectively match the destination address and transmission message of the status query message.

In Operation S426, when it is determined that the transmission intervals are regular (Yes in Operation S424), the transfer controller 76 checks whether or not the number of entries used for determining regularity of the transmission intervals has reached a predetermined number (e.g., five).

In Operation S432, when the description of the Reply Message 310 of the latest entry does not match the description of the received message (No in Operation S420), when it is determined that the transmission intervals are not regular (No in Operation S424), or when the number of entries used for determining regularity of the transmission intervals has not reached the predetermined number (No in Operation S426), the transfer controller 76 completes the entry for the status query message, i.e., writes a description of the Reply Message 310 thereto, and then adds the entry to the communication data table stored in the communication data storage 78.

In Operation S434, the transfer controller 76 causes the receiver 72 to transfer the received message. Thereafter, the process for delaying reception returns to Operation S412.

In Operation S436, when the number of entries used for determining regularity of the transmission intervals has reached the predetermined number (Yes in Operation S426), the transfer controller 76 saves the received message in the received data storage 80, and the receiver 72 deletes the received message from the reception buffer.

In Operation S438, the transfer controller 76 sets a timer with a predetermined time.

In Operation S440, the timer counts the set time.

In Operation S442, when the set time has elapsed (Yes in Operation S440), the transfer controller 76 retrieves the saved received message from the received data storage 80 to write the received message back to the reception buffer, and deletes the received message from the received data storage 80. Thereafter, the process for delaying reception proceeds to Operation S432.

According to the fifth embodiment of the present invention, it is possible to delay the received message without modifying an application program on the terminal.

Although the transfer of the received message is delayed in the fifth embodiment of the present invention, the transmission of a transmission message may be delayed instead.

Sixth Embodiment

In the above-discussed fifth embodiment, the transfer of the received data in the terminal is delayed to delay the transmission of a next status query message. Thus, even when a new mail arrives during the time, checking of the new mail is delayed since the transmission of the next status query message is delayed. In a sixth embodiment, when the terminal is a battery-powered terminal such as a mobile phone, the amount of communication is reduced only when the remaining capacity of the battery falls below a predetermined value.

Figure 18:
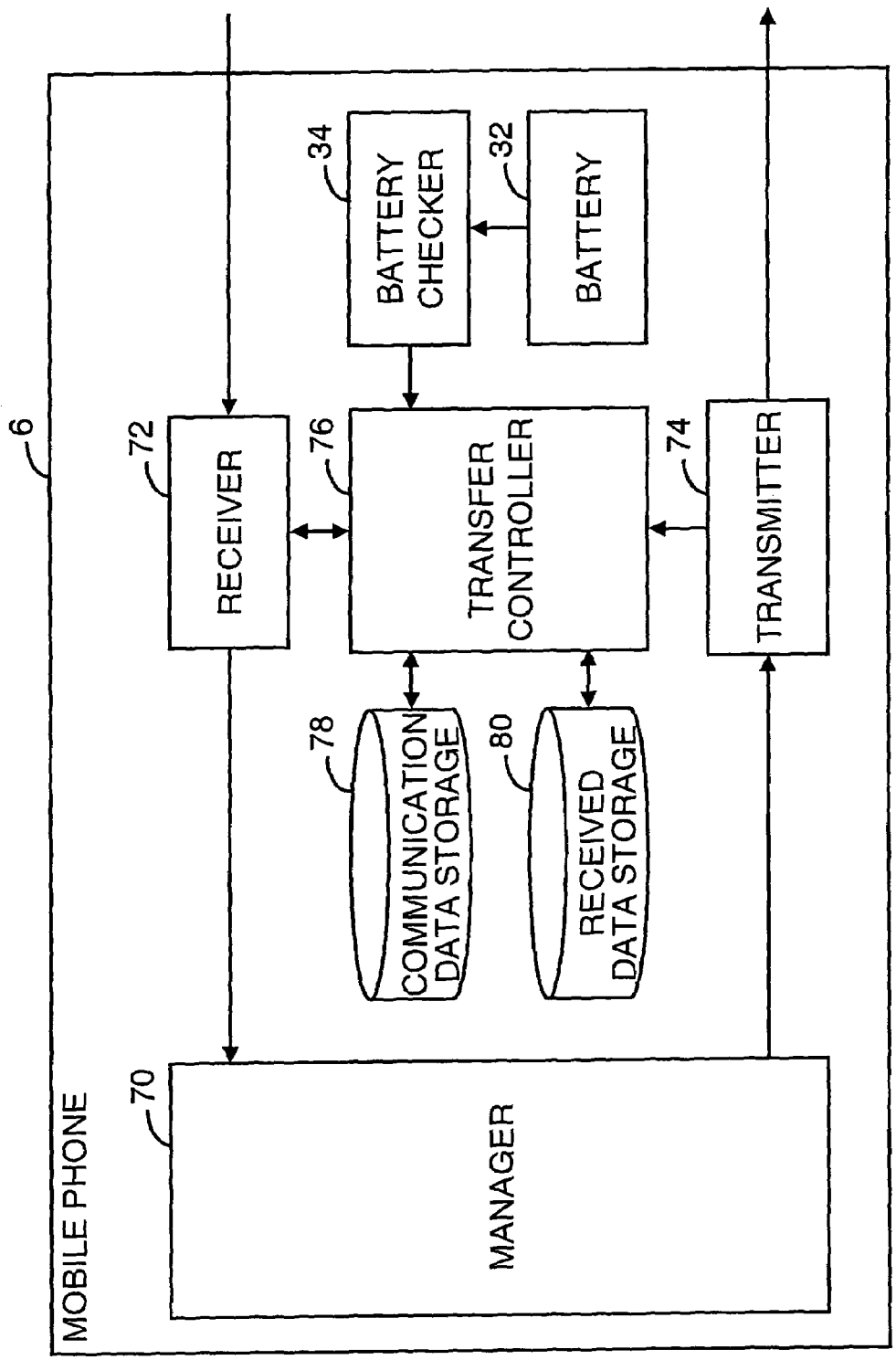
FIG. 18 is a block diagram illustrating a system configuration of a mobile phone according to a sixth embodiment of the present invention.

FIG. 18 is a block diagram showing the system configuration of a mobile phone according to the sixth embodiment of the present invention. The configuration shown in FIG. 18 differs from the configuration shown in FIG. 14 in that a battery 32 for powering the mobile phone and a battery checker 34 for checking the remaining capacity of the battery 32 are added.

The transfer controller 76 starts the process for controlling transfer when the battery checker 34 determines that the remaining capacity of the battery 32 falls below the predetermined value.

Figure 19:
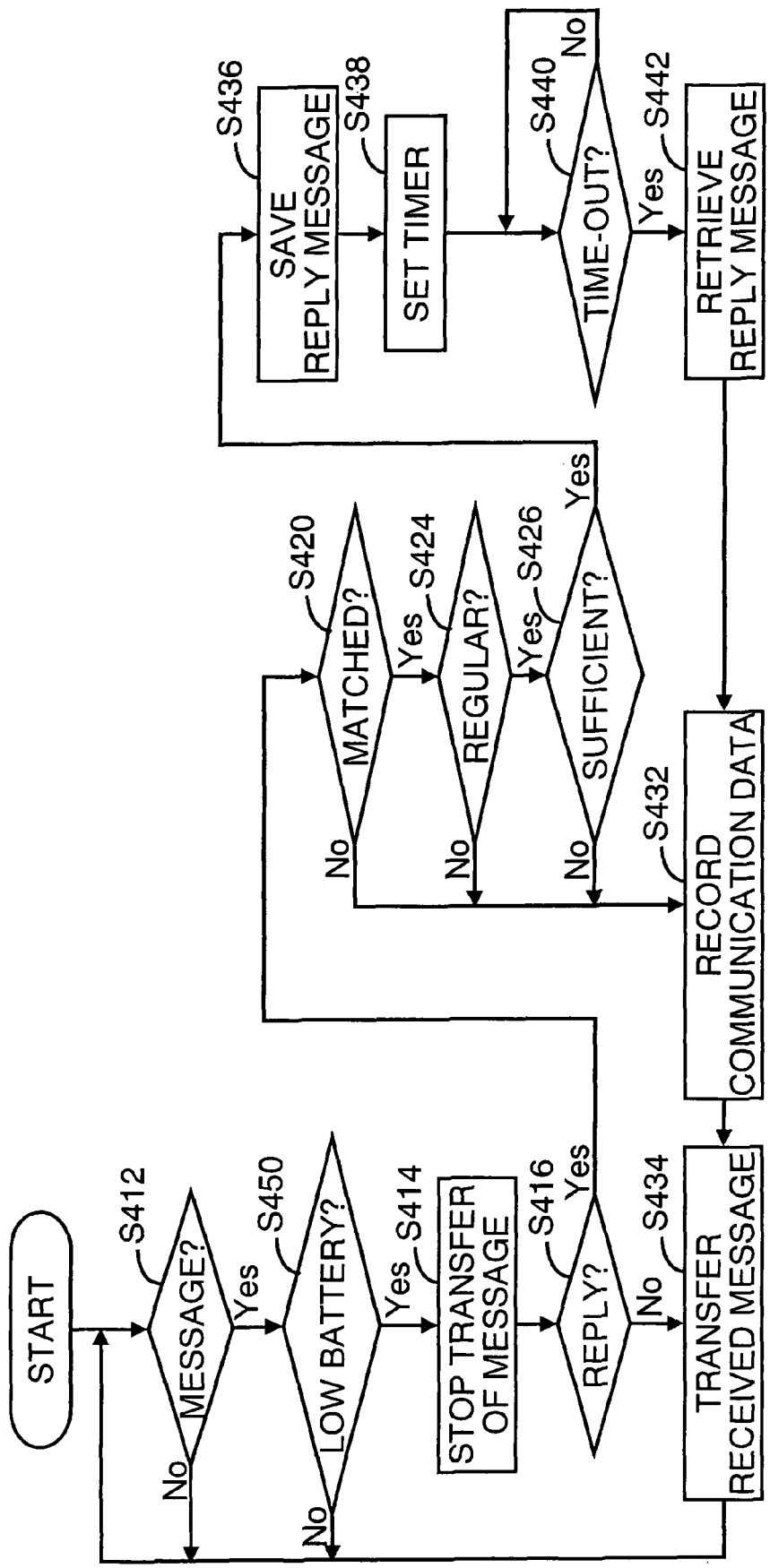
FIG. 19 is a diagram illustrating a flowchart of a process for delaying reception, which is performed by a mobile phone according to a sixth embodiment of the present invention.

FIG. 19 is a diagram illustrating a flowchart of a process for delaying reception, which is performed by a mobile phone according to a sixth embodiment of the present invention. The flowchart shown in FIG. 19 differs from the flowchart shown in FIG. 17 in that Operation S450 is added. In the flow of the process for delaying reception in the sixth embodiment of the present invention, the operation added to the flowchart shown in FIG. 17 will now be discussed with reference to FIG. 19.

In Operation S450, the battery checker 34 checks whether or not the remaining capacity of the battery 32 has fallen below the predetermined amount. When the remaining capacity of the battery 32 has not fallen below the predetermined value (No in Operation S450), the process for delaying reception returns to Operation S412. When the remaining capacity of the battery 32 has fallen below the predetermined value (Yes in Operation S450), the process for delaying reception proceeds to Operation S414.

According to the sixth embodiment of the present invention, when the amount of the remaining battery capacity of the mobile phone is large, frequent transmissions of the status query messages are permitted. This allows the mobile phone to synchronize with updated data on the server at relatively early time. On the other hand, when the amount of the remaining battery capacity becomes small, the mobile phone performs control so as to reduce the amount of communication. This arrangement makes it possible to reduce the power consumption.

Although a mobile phone has been discussed in the sixth embodiment of the present invention by way of example, the terminal that accesses the server is not limited to the mobile phone and may be any battery-powered terminal.

Seventh Embodiment

In a seventh embodiment, the amount of reception delay is adjusted in accordance with the remaining capacity of the battery of the mobile phone. The system configuration in the seventh embodiment of the present invention is similar to the system configuration of the sixth embodiment shown in FIG. 18.

Figure 20:
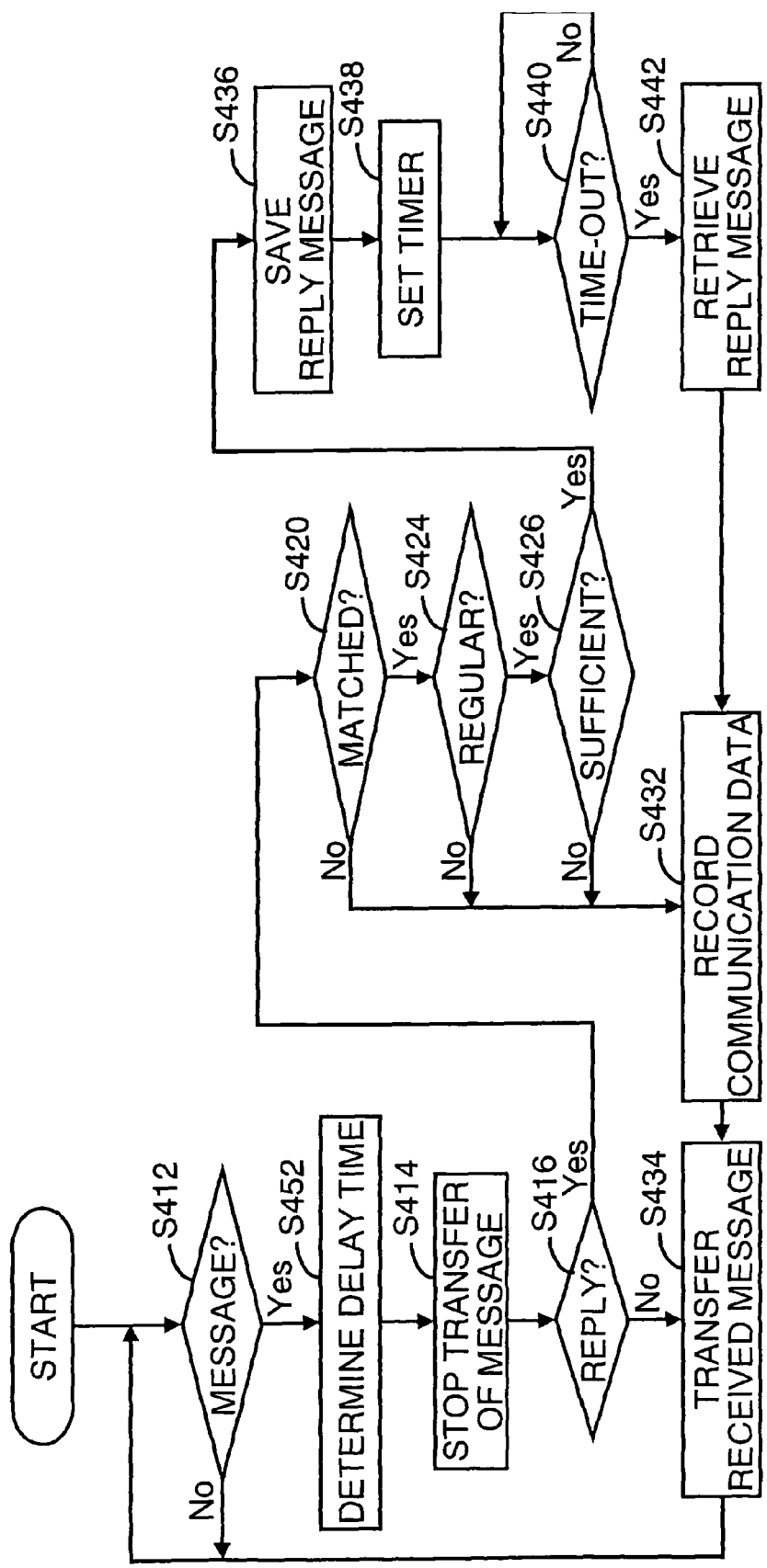
FIG. 20 is a diagram illustrating a flowchart of a process for delaying reception, which is performed by a mobile phone according to a seventh embodiment of the present invention.

FIG. 20 is a diagram illustrating a flowchart of a process for delaying reception, which is performed by a mobile phone according to a seventh embodiment of the present invention. The flowchart shown in FIG. 20 differs from the flowchart shown in FIG. 17 in that Operation S452 is added. In the flow of the process for delaying reception in the seventh embodiment of the present invention, the operation added to the flowchart shown in FIG. 17 will now be discussed with reference to FIG. 20.

In Operation S452, the battery checker 34 determines a delay time on the basis of the remaining capacity of the battery 32. The delay time is increased according to a decrease in the remaining capacity of the battery 32, and the delay time is decreased according to an increase in the remaining capacity of the battery 32. The delay time is set for the timer as the predetermined time in Operation S438.

According to the seventh embodiment of the present invention, since the delay time is set to a small value when the remaining capacity of the battery of the mobile phone is large, the status query messages are relatively frequently transmitted. This arrangement allows the mobile phone to synchronize with updated data on the server at relatively early time. On the other hand, since the delay time is set to a larger value as the remaining capacity of the battery decreases, the frequency of querying decreases. This arrangement provides an advantage in that the power consumption can be reduced.

Although a mobile phone has been discussed in the seventh embodiment of the present invention by way of example, the terminal that accesses the server is not limited to the mobile phone and may be any battery-powered terminal.

According to the embodiments of the present invention, the amount of communication performed by the terminal can be reduced by processes performed in one of apparatuses associated with the communication between the terminal and the server. Therefore, modification of only one apparatus can achieve the reduction, thus making it possible to provide a communication control method that can reduce the modification cost. It is also possible to provide a widely-applicable communication control method rather than a method for controlling communication between specific apparatuses.

The apparatuses according to the embodiments of the present invention can be implemented as not only hardware but also software for a computer. For example, the communication control apparatus can be implemented by creating a program for causing a computer to execute the functions of the receiver 12, the transmitter 14, the relay 16, the transfer controller 18, the communication proxy 22, the proxy register 26, and the manager 30 shown in FIG. 1, loading the program to a memory of the computer, and executing the program.

Figure 21:
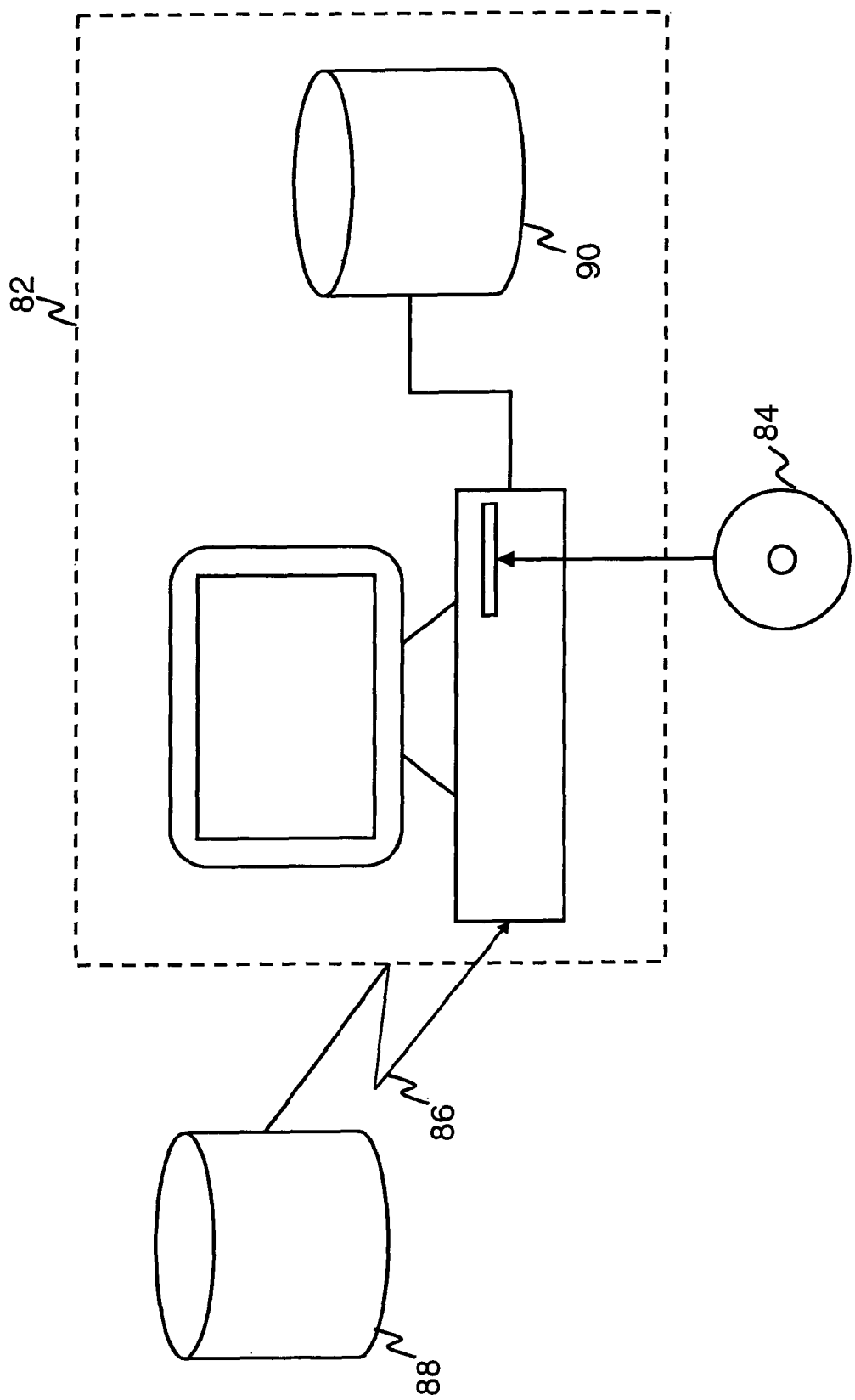
FIG. 21 is a diagram illustrating an example of a computer environment.

As shown in FIG. 21, the program for implementing the apparatuses according to the embodiments of the present invention may be stored on not only a portable storage medium 84, such as a CD-ROM, CD-RW, DVD-R, DVD-RAM, DVD-RW, or a flexible disk, but also another storage device 88 connected through a communication line 86 or a storage device/storage medium 90, such as a hard disk or a RAM in a computer system 82. During execution of the program, the program is loaded and is executed on a main memory.

Elements of the apparatuses according to the embodiments of the present invention may be realized in any combination. Some of the elements may be realized as one component or may be constituted by multiple components.

(Note 1) A communication control method executed by a communication relay apparatus for relaying communication messages, said communication relay apparatus having a communication data storage for storing first data regarding relayed communication messages, said method comprising:

storing the first data regarding the relayed communication messages in the communication data storage;

receiving a current communication message;

determining, on the basis of the first data stored in the communication data storage, whether the current communication message satisfies a first predetermined condition;

stopping relay of the current communication message satisfying the first predetermined condition; and continuing relay of the current communication message failing to satisfy the first predetermined condition.

(Note 2) The communication control method of Note 1, wherein
said communication relay apparatus relays communication messages exchanged between a first communication apparatus and a second communication apparatus,
said first data regards first communication messages transmitted from the first communication apparatus to the second communication apparatus, and
said operation of determining is operated, on the basis of the first data regarding the first communication messages, when the current communication message is a second communication message transmitted from the second communication apparatus to the first communication apparatus.

(Note 3) The communication control method of Note 1, wherein
said communication relay apparatus relays communication messages exchanged between a first communication apparatus and a second communication apparatus,
said first data regards second communication messages transmitted from the second communication apparatus to the first communication apparatus, and
said operation of determining is operated, on the basis of the first data regarding the second communication messages, when the current communication message is a second communication message transmitted from the second communication apparatus to the first communication apparatus.

(Note 4) The communication control method of Note 1, wherein
said first data includes at least one of
descriptions of the relayed communication messages,
sent times of the relayed communication messages, and
received times of the relayed communication messages, and
said operation of determining includes at least one of
determining on the basis of the descriptions of the relayed communication messages,
determining on the basis of the sent times of the relayed communication messages, and
determining on the basis of the received times of the relayed communication messages.

(Note 5) The communication control method of Note 4, wherein
said first predetermined condition includes at least one of
that a description of the current communication message matches one of the descriptions of the relayed communication messages included in the first data, and
that a sent time or a received time of the current communication message satisfies a third predetermined condition with the sent times or the received times of the relayed communication messages.

(Note 6) The communication control method of Note 1, wherein
said operation of stopping relay includes at least one of
stopping and canceling relay of the current communication message, and
stopping relay of the current communication message to resume the relay upon satisfying a second predetermined condition.

(Note 7) The communication control method of Note 6, wherein
said second predetermined condition includes
elapse of a predetermined time after stopping relay of the current communication message.

(Note 8) The communication control method of Note 2, further comprising:
transmitting a proxy transmission message containing a description of the first communication messages to the second communication apparatus during a time period of stopping relay of the current communication message.

(Note 9) The communication control method of Note 8, said communication relay apparatus further having a proxy data storage for storing proxy data including a destination address and a description of the proxy transmission message, said method further comprising:
generating the proxy transmission message on the basis of the proxy data stored in the proxy data storage.

(Note 10) The communication control method of Note 9, said proxy data further including a reply to address and an assumed reply message, said method further comprising:
transmitting to the reply-to address a reply message received for the proxy transmission message if the reply message does not match the assumed reply message.

(Note 11) The communication control method of Note 9, wherein
said proxy data further includes a transmission interval of the proxy transmission message.

(Note 12) A communication control apparatus comprising:
a receiver for receiving communication messages;
a transmitter for transmitting the communication messages;
a relay for relaying communication messages by transferring communication messages received by the receiver to the transmitter;
a communication data storage for storing first data regarding relayed communication messages; and
a transfer controller for controlling relay of a current communication message received by the receiver by determining whether the current communication message satisfies a first predetermined condition, to stop transfer of the current communication message satisfying the first predetermined condition and continue transfer of the current communication message failing to satisfy the first predetermined condition.

(Note 13) The communication control apparatus of Note 12, wherein
said communication control apparatus relays communication messages exchanged between a first communication apparatus and a second communication apparatus,
said first data regards first communication messages transmitted from the first communication apparatus to the second communication apparatus, and
said transfer controller determines whether the current communication message satisfies the first predetermined condition on the basis of the first data regarding the first communication messages stored in the communication data storage, when the current communication message is a second communication message transmitted from the second communication apparatus to the first communication apparatus.

(Note 14) The communication control apparatus of Note 12, wherein
said communication control apparatus relays communication messages exchanged between a first communication apparatus and a second communication apparatus,
said first data regards second communication messages transmitted from the second communication apparatus to the first communication apparatus, and
said transfer controller determines whether the current communication message satisfies the first predetermined condition on the basis of the first data regarding the second communication messages stored in the communication data storage, when the current communication message is a second communication message transmitted from the second communication apparatus to the first communication apparatus.

(Note 15) The communication control apparatus of Note 12, wherein
said first data includes at least one of
descriptions of the relayed communication messages, sent times of the relayed communication messages, and received times of the relayed communication messages, and
said transfer controller includes at least one of
a first determiner for determining on the basis of the descriptions of the relayed communication messages stored in the communication data storage whether the current communication message satisfies the first predetermined condition,
a second determiner for determining on the basis of the sent times of the relayed communication messages stored in the communication data storage whether the current communication message satisfies the first predetermined condition, and
a third determiner for determining on the basis of the received times of the relayed communication messages stored in the communication data storage whether the current communication message satisfies the first predetermined condition.

(Note 16) The communication control apparatus of Note 15, wherein
said first predetermined condition includes at least one of
that a description of the current communication message matches one of the descriptions of the relayed communication messages included in the first data,
that a sent time of the current communication message satisfies a third predetermined condition with the sent times of the relayed communication messages, and
that a received time of the current communication message satisfies the third predetermined condition with the received times of the relayed communication messages.

(Note 17) The communication control apparatus of Note 12, wherein
said transfer controller includes at least one of
a first controller for stopping and canceling relay of the current communication message, and
a second controller for stopping relay of the current communication message to resume the relay upon satisfying a second predetermined condition.

(Note 18) The communication control apparatus of Note 17, wherein
said second predetermined condition includes
elapse of a predetermined time after stopping relay of the current communication message.

(Note 19) The communication control apparatus of Note 13, further comprising:
a communication proxy for transmitting a proxy transmission message containing a description of the first communication messages to the second communication apparatus during a time period of stopping relay of the current communication message.

(Note 20) The communication control apparatus of Note 19, further comprising:
a proxy data storage for storing proxy data including a destination address and a description of the proxy transmission message,
wherein
said communication proxy generates the proxy transmission message on the basis of the proxy data stored in the proxy data storage.

(Note 21) The communication control apparatus of Note 20, wherein
said proxy data further includes a reply-to address and an assumed reply message, and
said communication proxy transmits to the reply-to address a reply message received for the proxy transmission message if the reply message does not match the assumed reply message.

(Note 22) The communication control apparatus of Note 20, wherein
said proxy data further includes a transmission interval of the proxy transmission message.

(Note 23) A computer readable storage medium storing a program of instructions to a computer for executing a communication control method, said computer relaying communication messages, said computer having a communication data storage for storing first data regarding relayed communication messages, said method comprising:
storing the first data regarding the relayed communication messages in the communication data storage;
receiving a current communication message;
determining, on the basis of the first data stored in the communication data storage, whether the current communication message satisfies a first predetermined condition;
stopping relay of the current communication message satisfying the first predetermined condition; and
continuing relay of the current communication message failing to satisfy the first predetermined condition.

(Note 24) A service server for receiving a first communication message from a terminal and transmitting a second communication message in response to the first communication message to the terminal, comprising:
a receiver for receiving the first communication message;
a transmitter for transmitting the second communication message;
a communication data storage for storing first data regarding communication messages; and
a transmission controller for controlling transmission of the second communication message in response to the first communication message by determining whether the first communication message satisfies a first predetermined condition, to stop transmission of the second communication message the first predetermined condition and continue transfer of the current communication message failing to satisfy the first predetermined condition.

(Note 25) A terminal for transmitting a first communication message to a service server and receiving a second communication message in response to the first communication message from the service server, comprising:
a receiver for receiving and transferring the second communication message;
a transmitter for transmitting the first communication message;
a communication data storage for storing first data regarding communication messages; and
a transfer controller for controlling transfer of the second communication message in response to the first communication message by determining, on the basis of the first data stored in the communication data storage, whether the second communication message satisfies a first predetermined condition, to stop transfer of the second communication message satisfying the first predetermined condition and continue transfer of the current communication message failing to satisfy the first predetermined condition.

(Note 26) The terminal of Note 25, said terminal being powered by a battery, said terminal further comprising:
a battery checker for checking remaining capacity of the battery,
wherein
said transfer controller controls transfer of the second communication message on the basis of the remaining capacity of the battery checked by the battery checker.

(Note 27) The terminal of Note 26, wherein
said transfer controller stops transfer of the second communication message when the battery checker determines that the remaining capacity of the battery has fallen below a predetermined capacity and continues transfer of the second communication message when the battery checker determines that the remaining capacity of the battery is a predetermined capacity or more.

(Note 28) The terminal of Note 26, wherein
said transfer controller delays transfer of the second communication message on the basis of the remaining capacity of the battery.

What is claimed is:

1. A communication control method executed by a communication relay apparatus for relaying communication messages exchanged between a terminal and a server, the communication relay apparatus having a communication data storage for storing data regarding relayed communication messages, said method comprising:
relaying a first communication message transmitted from the terminal to the server, the first communication message being a query message for querying presence of new mail;
storing the first data regarding the first communication message in the communication data storage;
relaying a second communication message transmitted from the server to the terminal in response to the first communication message;
storing second data regarding the second communication message in the communication data storage;
relaying a third communication message transmitted from the terminal to the server, the third communication message being a query message for querying presence of new mail;
receiving a fourth communication message transmitted from the server in response to the third communication message;
determining, on the basis of the first data and the second data stored in the communication data storage, whether the fourth communication message satisfies a first predetermined condition, where the first predetermined condition is that the fourth communication message matches a stylized reply message in repeated communications in which a query message and the stylized reply message are exchanged repeatedly;
stopping relay of the fourth communication message and transmitting the third communication message to the server when the fourth communication message satisfies the first predetermined condition; and
continuing relay of the fourth communication message failing to satisfy the first predetermined condition.

2. The communication control method of claim 1, wherein the first data includes at least one of
descriptions of the relayed communication messages,
sent times of the relayed communication messages, and
received times of the relayed communication messages, and
wherein said determining includes at least one of
determining on the basis of the descriptions of the relayed communication messages,
determining on the basis of the sent times of the relayed communication messages, and
determining on the basis of the received times of the relayed communication messages.

3. The communication control method of claim 1, wherein the stopping relay includes at least one of
stopping and canceling relay of the fourth communication message, and
stopping relay of the fourth communication message to resume the relay upon satisfying a second predetermined condition.

4. The communication control method of claim 3, wherein the second predetermined condition includes elapse of a predetermined time after stopping relay of the fourth communication message.

5. A communication control apparatus for relaying communication messages exchanged between a terminal and a server, said communication control apparatus comprising:
a computer programmed to perform
relaying a first communication message transmitted from the terminal to the server, the first communication message being a query message for querying presence of new mail;
storing first data regarding the first communication message in a communication data storage;
relaying a second communication message transmitted from the server to the terminal in response to the first communication message;
storing second data regarding the second communication message in the communication data storage;
relaying a third communication message transmitted from the terminal to the server, the third communication message being a query message for querying presence of new mail;
receiving a fourth communication message transmitted from the server in response to the third communication message;
determining, based on the first data and the second data stored in the communication data storage, whether the fourth communication message satisfies a first predetermined condition, where the first predetermined condition is that the fourth communication message matches a stylized reply message in repeated communications in which a query message and the stylized reply message are exchanged repeatedly;
stopping relay of the fourth communication message and transmitting the third communication message to the server when the fourth communication message satisfies the first predetermined condition; and
continuing relay of the fourth communication message failing to satisfy the first predetermined condition.

6. The communication control apparatus of claim 5,
wherein the first data includes at least one of
descriptions of the relayed communication messages,
sent times of the relayed communication messages, and
received times of the relayed communication messages, and
wherein said determining includes at least one of
determining on the basis of the descriptions of the relayed communication messages,
determining on the basis of the sent times of the relayed communication messages, and determining on the basis of the received times of the relayed communication messages.

7. The communication control apparatus of claim 5, wherein the stopping of the relay includes at least one of
stopping and canceling relay of the fourth communication message, and
stopping relay of the fourth communication message to resume the relay upon satisfying a second predetermined condition.

8. A non-transitory computer readable storage medium storing a program causing a computer to execute a communication control method, the computer relaying communication messages exchanged between a terminal and a server, the computer having a communication data storage for storing data regarding relayed communication messages, said method comprising:
relaying a first communication message transmitted from the terminal to the server, the first communication message being a query message for querying presence of new mail;
storing first data regarding the first communication message in the communication data storage;
relaying a second communication message transmitted from the server to the terminal in response to the first communication message;
storing second data regarding the second communication message in the communication data storage;
relaying a third communication message transmitted from the terminal to the server, the third communication message being a query message for querying presence of new mail;
receiving a fourth communication message transmitted from the server in response to the third communication message;
determining, on the basis of the first data and the second data stored in the communication data storage, whether the fourth communication message satisfies a first predetermined condition, where the first predetermined condition is that the fourth communication message matches a stylized reply message in repeated communications in which a query message and the stylized reply message are exchanged repeatedly;
stopping relay of the fourth communication message and transmitting the third communication message to the server when the fourth communication message satisfies the first predetermined condition; and
continuing relay of the fourth communication message failing to satisfy the first predetermined condition.

* * * * *